(12) United States Patent
Bhardwaj et al.

(10) Patent No.: US 7,698,140 B2
(45) Date of Patent: Apr. 13, 2010

(54) MESSAGE TRANSCRIPTION, VOICE QUERY AND QUERY DELIVERY SYSTEM

(75) Inventors: Vinod K. Bhardwaj, San Jose, CA (US); Scott England, Los Gatos, CA (US); Dean Whitlock, Bristol, TN (US)

(73) Assignee: FoneWeb, Inc., Santa Clara, CA (US)

( * ) Notice: Subject to any disclaimer, the term of this patent is extended or adjusted under 35 U.S.C. 154(b) by 674 days.

(21) Appl. No.: 11/368,840

(22) Filed: Mar. 6, 2006

(65) Prior Publication Data

US 2007/0208570 A1  Sep. 6, 2007

(51) Int. Cl.
*G10L 13/00* (2006.01)
*G10L 13/08* (2006.01)

(52) U.S. Cl. .................. 704/260; 704/258; 704/267

(58) Field of Classification Search .............. 704/260, 704/267
See application file for complete search history.

(56) References Cited

U.S. PATENT DOCUMENTS 5,715,370 A * 2/1998 Luther et al. ............. 704/270.1
7,197,459 B1   3/2007 Harinarayan et al.
2001/0005825 A1 * 6/2001 Engelke et al. ............ 704/235
2002/0095290 A1 * 7/2002 Kahn et al. ................ 704/260
2005/0289130 A1 * 12/2005 Cohen et al. ................. 707/3

FOREIGN PATENT DOCUMENTS

WO   WO 0193058 A1 * 12/2001

* cited by examiner

*Primary Examiner*—David R Hudspeth
*Assistant Examiner*—Justin W Rider
(74) *Attorney, Agent, or Firm*—Beyer Law Group LLP

(57) ABSTRACT

A message transmission system accepts a telephone call from a user who wishes to send an e-mail message, send an SMS message, perform an Internet query or retrieve his or her electronic mail. The voice call is transcribed and the message is sent, or the question in the voice call is transcribed and answered by an agent. Any number of agents connect to a central site over an Internet connection and transcribe messages or answer queries in an assembly line like fashion. In addition, a Web query delivery system accepts a query or statement from a user; the query is transcribed, classified, and then broadcast over any medium to any number of experts or web sites that desire to answer the particular type of query received. The entire query is delivered to an expert or web site who provides a full answer to the user.

4 Claims, 24 Drawing Sheets

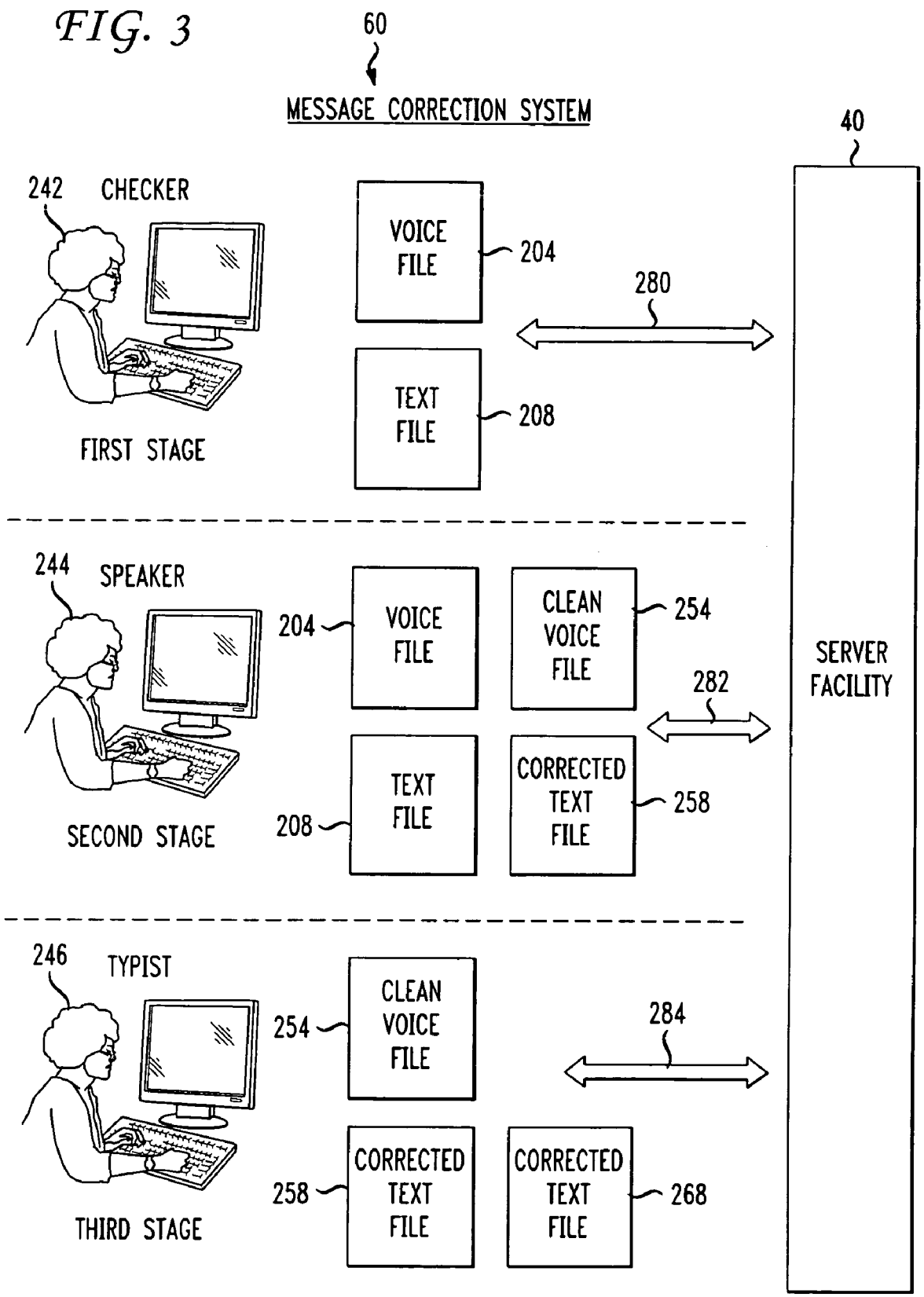

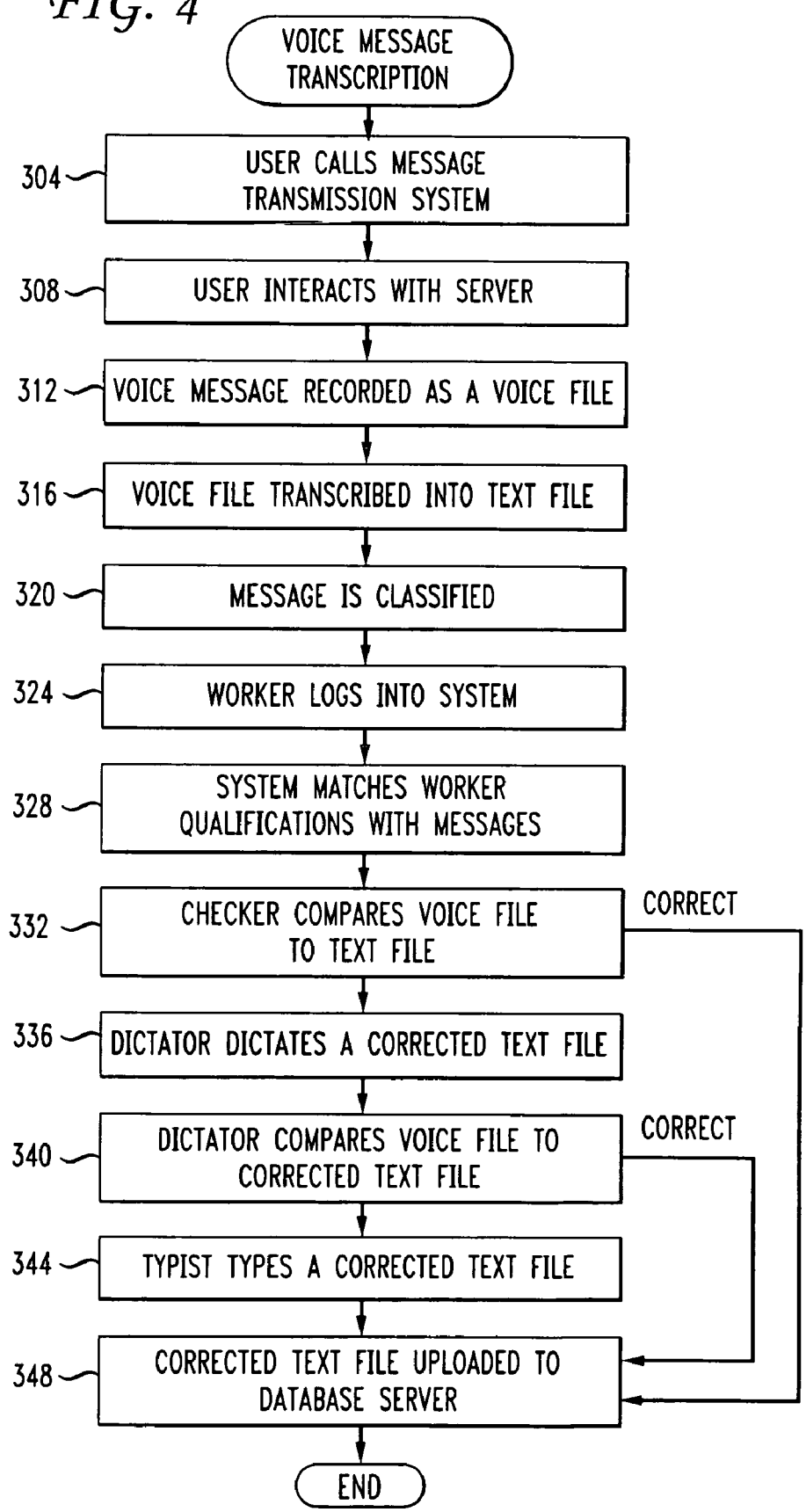

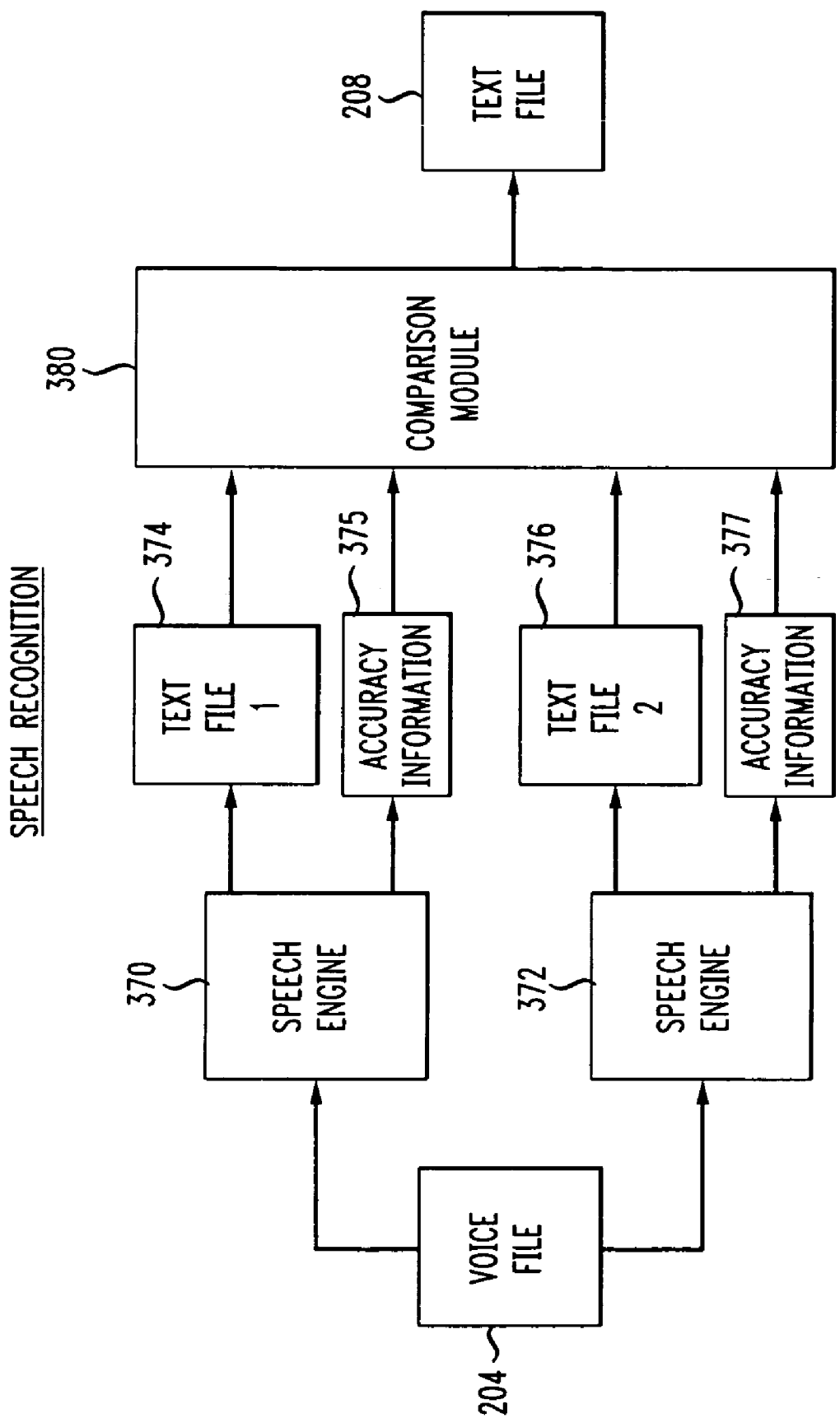

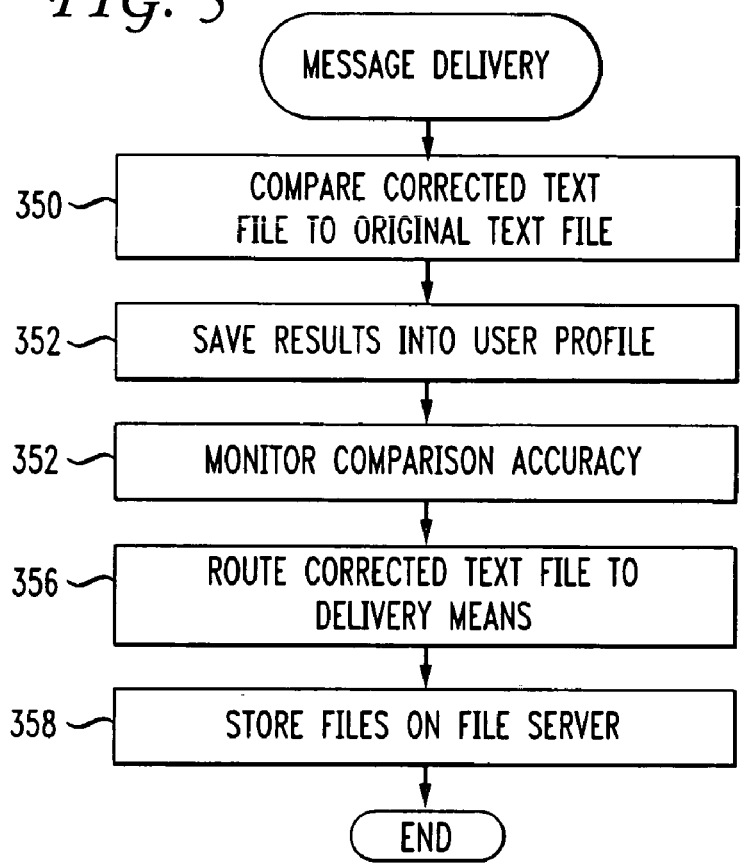
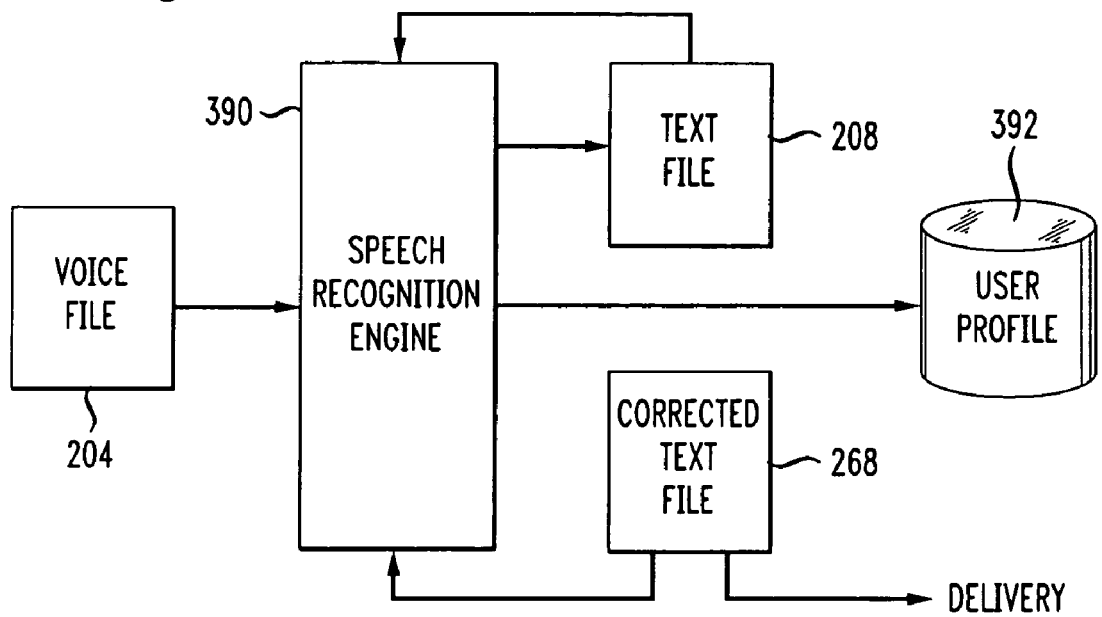

FIG. 11

| USER PERSONAL INFORMATION | | |
|---|---|---|
| First Name | | |
| Last Name | | |
| Telephone Country Code | ▽ | |
| Telephone Number | | Use the number you will most frequently use to access the service as this will be your account username. Example: (city code telephone number ie. 555-123-4567) |
| PIN | | Used to access the service by phone, between 4 and 6 digit only |
| Email Address | | |
| Password | | Must be between 4 and 10 characters. |
| re-enter Password | | |
| Street | | |
| Street | | |
| City | | |
| State | | |
| Zip | | |
| Country | ▽ | |
| Do you wish to send a copy of every message you send by telephone to your by email? | ✓ | |
| Email Address to send the copy to? | | |
| I am 13 years or older | ✓ | You must be at least 13 to fill out this form. |

Submit

FIG. 12

E-MAIL ADDRESS BOOK

660

Quick Search [ ] [FIND IT]

| Country code | First Name | Last Name | Telephone Number | Email |
|---|---|---|---|---|
| | | | | |
| | | | | |
| | | | | |
| | | | | |
| | | | | |

[PREVIOUS]   RECORDS 1 to 2 of 2   [NEXT]

Addressbook Detail View

First Name [ ]   [ADD NEW]

Last Name [ ]   [SAVE CHANGES]

Telephone Country Code [ ]   [DELETE]

Telephone Number [ ]   [DESELECT]

Email [ ]

| | Password | | Port | | Pop ▷ | Description No ▷ | Submit |
|---|---|---|---|---|---|---|---|
| | The password needed to access your account. | | If your mail server uses a non-standard port–please enter it here. Otherwise leave it blank. | | | This is the name that is announced when you call in to check your mail with the phone. You can make this anything you like however names like "Work" or "GMAIL" are suggested. | |

| E-MAIL ACCOUNTS |
|---|

680

Add a new email account

Email Account [ ▽ ]

| login | domain | Server | port | Type | Description | SSL | Order |
|---|---|---|---|---|---|---|---|
| | | | | | | | |
| | | | | | | | |
| | | | | | | | |
| | | | | | | | |
| | | | | | | | |

[PREVIOUS]    RECORDS 1 to 1 of 1    [NEXT]

Email Detail View login [ ]
domain [ ]
password [ ]
re-enter password [ ]
Server [ ]
port [ ]
Type [ POP ]
Desc [ Work ]
SSL [ ▽ ]
Order messages are announced [ ▽ ]

[SAVE CHANGES]
[DELETE]
[DESELECT]

| MATCH DATABASE | | | |
|---|---|---|---|
| EXPERT NAME | CONTACT | CATEGORIES | KEYWORDS |
| Fred Smith | fred@aol.com | A, B, C, D | X, Y, Z |
| ⋮ | ⋮ | ⋮ | ⋮ |

FIG. 19

| FAQ DATABASE | | | |
|---|---|---|---|
| IDENTIFIER | QUERY | EQUIVALENTS | ANSWER |
| 1 | "xxxxxxx" | 47 | "yyyyyyy" |
| 2 | "xxxxxxx" | 18, 32 | "yyyyyyy" |
| ⋮ | ⋮ | ⋮ | ⋮ |

FIG. 20

ASSOCIATED DATABASE FIELDS

| 802 | 804 | 806 | 808 |
|---|---|---|---|
| CLASSIFIED ? | SENT QUERY ? | DELIVERY MEANS | CATEGORY |

| 810 | 812 |
|---|---|
| KEYWORDS | RECIPIENT ADDRESS |

MESSAGE TRANSCRIPTION, VOICE QUERY AND QUERY DELIVERY SYSTEM

FIELD OF THE INVENTION

The present invention relates generally to telecommunications, electronic mail and the Internet. More specifically, the present invention relates to delivery of electronic messages, formulation of queries that are initiated with a telephone, and broadcasting of web queries.

BACKGROUND OF THE INVENTION

The use of mobile telephones is becoming more prevalent. More people now carry mobile telephones wherever they go; they expect a signal in most locations and expect to be able to communicate with others and to receive information virtually anytime and anywhere. But, the current technological climate hampers the ability of a person to send and receive information.

For example, the traditional mobile telephone is not equipped to send and receive e-mail messages, and while newer mobile telephones can send and receive SMS text messages, using a keypad with 8 keys to send messages based on a 26-character alphabet is not the easiest or the most efficient proposition. An individual might choose a personal digital assistant (PDA) or a handheld wireless device to send and receive e-mail messages, but again, the user is hampered by a small form factor and tiny keys that require painstaking dexterity.

Further, an individual often finds himself in a situation where they desire information or an answer to question, but do not have ready access to a computer, printed material, a nearby library or another good source of information that can answer the question. What the individual does often have, though, is a mobile telephone or even a land line. In these situations it would be desirable to simply pick up the telephone and ask question and have the answer be delivered promptly. In addition, an individual equipped with a telephone often desires to access their e-mail messages from any of a variety of different types of e-mail servers using different protocols.

Based upon the above state of technology and the needs of individuals, a system and method are desired that would address the above needs.

Further, it is now commonplace for people to use an Internet search engine to frequently search for information. A few keywords or query is entered into a search engine search screen, the search is processed, and the search engine returns a lengthy list of relevant (one hopes) web sites, usually listed in order from the believed most relevant to the believed least relevant. The user then scans the list of web sites, chooses one that he or she believes will be most relevant, and clicks on the link. Once at that web site, the user must still ferret out the exact information that the user is looking for. Quite often a user scans the list of returned web sites, only to realize that none of the selections will be relevant, and then it is necessary to formulate another query or to supply different keywords for the search engine. Of course, occasionally a chosen link to a web site will lead the user to the exact information (more or less) that the user had in mind when he or she originally formulated a query or the keywords.

But, when the user chooses a link to visit a particular web site and then arrives at that web site, that particular web site has no idea what the user is looking for. The web site is not aware of the question formulated in the user's mind, and is not aware of the query or keywords presented to the search engine. The chosen web site does not then perform a search itself based upon the user's original query. The search engine has delivered a list of relevant web sites to the user, but it is then up to the user himself to investigate these web sites using the query that he has formulated in his mind. For example, a user who wishes to find the best deal on an airline ticket to Europe during the summer might enter a query such as "Europe summer low airline ticket," hoping that a relevant web site will pop up giving the user an immediate, succinct, accurate recommendation about which airline to choose for which particular European city at which particular time. Of course, those who perform queries such as these realize it is all too common that the result will be hundreds of web sites all offering some type of information about airline flights to Europe during the summer, but none clearly offering the exact answer to the question that the user wants answered.

The user is looking for higher-level information that will answer a very specific question. Currently there are web sites (such as "411-type" web sites) that provide information to a user that is already listed and categorized on the web site. But, the user can only get that information that has already been categorized. The user cannot do a higher-level search to look for information that is not already on the Web. Using the above example, the user will find plenty of voluminous information about advertised low flight prices and dates, but will not find a brief, authoritative answer to his question.

Similarly, a user who has a particular budget and wishes to purchase a certain set of books can do an Internet search for the book titles, but has no way to say "I have this budget, I would like to buy these books, and who can sell them to me today at the lowest price?" An Internet search engine simply returns all seemingly relevant web sites that match the keywords in the query. Even if the user types in a lengthy query such as the one above, it is usually distilled down to the relevant keywords that are submitted to the Internet search engine, and the user is still faced with a lengthy list of possibly relevant web sites. Because there is no higher-level intelligence in the query itself it is not exactly clear what the user wants. Of course, the user knows exactly what they want, but that crystallized thought in the brain of the user never makes it to a web site or to an individual that might be able to provide the exact answer.

Based upon the above state of technology and the needs of individuals, a system and method are desired that would address the above needs.

SUMMARY OF THE INVENTION

To achieve the foregoing, and in accordance with the purpose of the present invention, a message transmission system is disclosed that allows a user to send an e-mail message or text message simply by picking up a telephone. The system also allows the user to ask a question by telephone and to receive an answer by e-mail, text message, etc. A user may also retrieve their e-mail messages by telephone and have the messages read back using voice synthesis.

In order to transcribe a message to be sent out or a query to be answered, the system uses a series of workers having particular skills. The workers are organized in an assembly line-like process, each worker up the line having a different skill or having greater expertise. Messages are sent and questions are answered using a divide and conquer approach in which each worker may be located virtually anywhere. Man and machine also work together in that information is processed using a combination of sophisticated computer software and human skills.

A web query delivery system is also disclosed that allows a user to send a query (or other statement) to an Internet search portal and have that query be broadcast to interested parties who can answer the query or act upon the statement.

In one embodiment, in order to classify the query to be answered, the system uses a combination of man and machine. Software is used to initially classify the query, and then a human refines the classification if needed. Workers can also be organized in an assembly line-like process, each worker up the line having a different skill or having greater expertise at classifying the query, reformulating the query, identifying keywords, etc. A divide-and-conquer approach is used in which each worker may be located virtually anywhere. Man and machine work together in that information is processed using a combination of sophisticated computer software and human skills. Once categorized, the query is distributed to an expert who can answer the query, or broadcast to any number of web sites that have indicated they do have expertise in answering those types of queries.

The user is thus able to formulate an exact query and have that query broadcast to the individual or individuals who can answer the query. The user is able to broadcast exactly what they need. The present invention distributes the queries and allows an expert or other individual to use whatever means or technology they want to answer the query. In this fashion, instead of a web site being accessible to the whole world a particular query may be accessible to the whole world (or least to those web sites indicating a desire to view certain queries). Because the user's exact query (or statement or command) is broadcast and received by an individual or entity able to answer that query, the user is assured of receiving the specific answer they need.

BRIEF DESCRIPTION OF THE DRAWINGS

The invention, together with further advantages thereof, may best be understood by reference to the following description taken in conjunction with the accompanying drawings in which:

FIG. 3 is a message correction system according to another embodiment of the invention.

FIG. 4 is a flow diagram describing how a voice message from a user is transcribed accurately.

FIG. 4A describes speech recognition in more detail.

FIG. 5 is a flow diagram describing a process by which the corrected text file is delivered to a recipient.

FIG. 5A is a block diagram showing one technique by which text files are compared and a user profile is updated.

FIG. 11 illustrates a data entry screen by which a user enters personal information in order to sign-up for the message transmission system.

FIG. 12 illustrates a user's e-mail address book.

FIG. 13 illustrates a data entry screen by which the user provides detailed information about his or her e-mail server.

FIG. 14 illustrates e-mail accounts from which a user may retrieve e-mail messages.

FIG. 18 illustrates a match database used to store the names of experts who have registered with the search portal and their desired categories.

FIG. 19 illustrates one such FAQ database maintained by the search portal server.

FIG. 20 illustrates database fields of a database that are associated with a particular query from a user.

DETAILED DESCRIPTION OF THE INVENTION

Figure 1A:
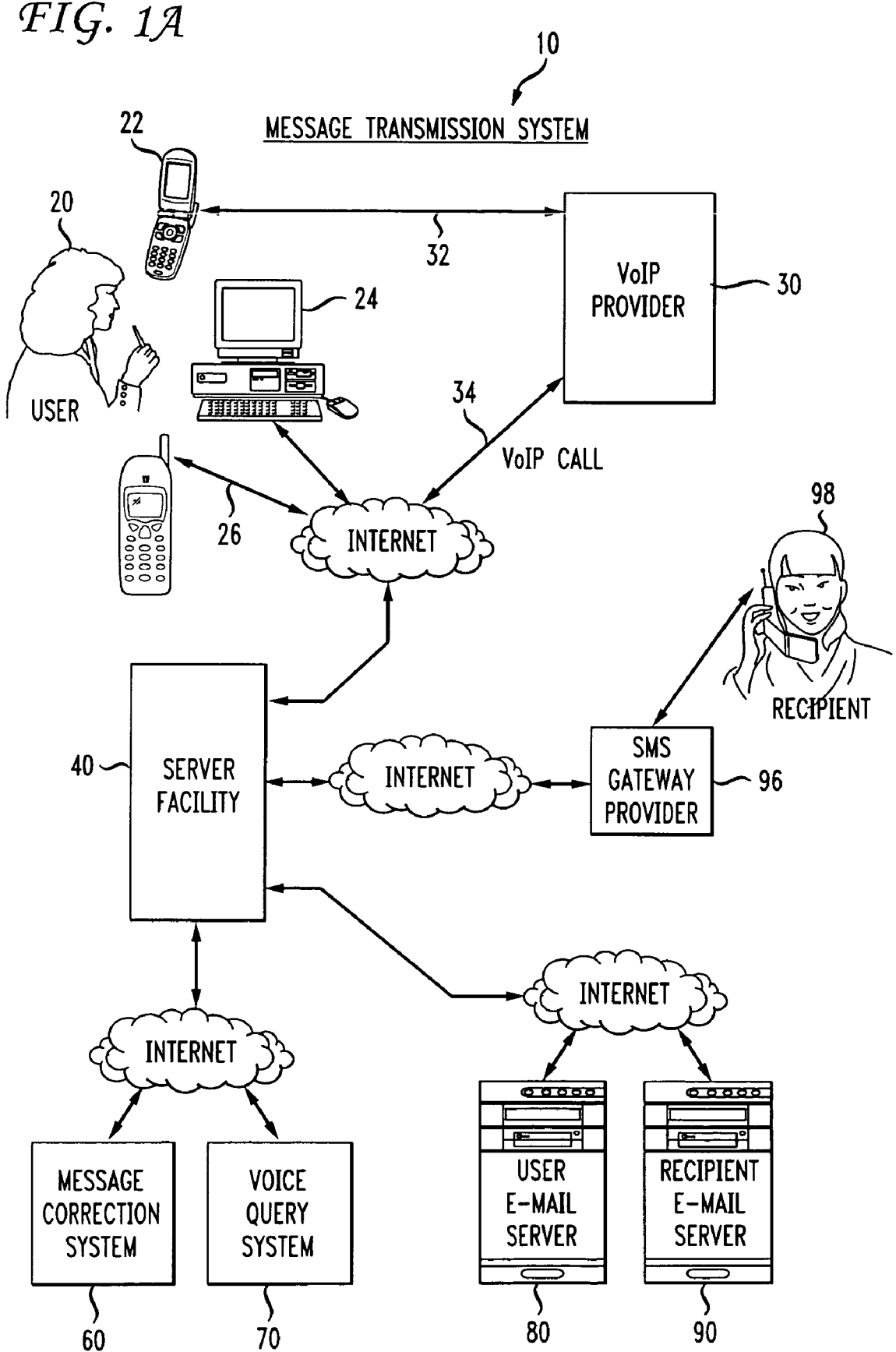
FIG. 1A is a block diagram of a message transmission system.

FIG. 1A is a block diagram of a message transmission system 10. Included are an individual 20 and access devices such as a telephone 22 and a computer 24. Telephone 22 is any suitable telephone such as a traditional rotary dial or touch tone telephone, cordless telephone, cellular telephone, mobile telephone, or any similar device arranged to transmit voice over a PSTN line. For example, PDAs or similar handheld electronic communication devices might also be arranged to function as telephones. Telephone 22 communicates with a VoIP (voice over IP) provider 30 over a PSTN line 32 or over any other suitable telecommunications line for connecting a telephone with VoIP provider 30. VoIP provider 30 is any suitable VoIP provider arranged to accept a local telephone call, convert it into VoIP format and to transmit it over the Internet as a VoIP call 34 to a server facility 40.

In one embodiment of the invention, FoneWeb, Inc. of Santa Clara, Calif. functions as its own VoIP provider and operates facilities in Fremont, Calif. and in Goa, India for supplying local access numbers and operates a T1 PSTN line for receiving calls using Direct Inward Dialing (DID). Any number of other commercial VoIP providers are also made available to provide local access telephone numbers in countries around the world. Currently, local access numbers are available in over 90 cities around the world.

In an alternative embodiment, user 20 places a VoIP call directly using a computer 24 or an IP telephone 26. For example, user 20 may use an analog telephone adapter to connect a standard telephone to his computer or Internet connection in order to place a VoIP call using a VoIP provider. Computer 24 may also be used with appropriate software and an Internet connection to directly place a VoIP call. Or, user 20 may use an IP telephone 26 that has an Ethernet connector that connects directly to a router to place a VoIP call, or may use a WiFi IP telephone to place a VoIP call from any WiFi hot spot. For example, by using an IP telephone a user can make a direct VoIP call; they would enter an IP telephony address, a direct IP address or use the ENUM system.

In another possible embodiment, VoIP provider 30 is not used and the user places a call directly from telephone 22 over a PSTN line to server facility 40. In a preferred embodiment, though, a VoIP provider is used because the cost is lower, the voice data is digitized for later use, and because a VoIP provider is better able to provide local access numbers in a variety of locations around the world using DID. A user may also dial the server facility directly without using a VoIP provider and by using an IP telephone as discussed above.

Server facility 40 is any suitable facility for housing any number of computer servers and associated application software for receiving incoming telephone calls, processing those calls, farming out messages or requests for information and responding to the user. As shown, facility 40 is a central location but the individual servers can also be distributed as described below. Included are any number of servers and their associated application software for performing specialized tasks within message transmission system 10. Each server generally performs a single task, although it is possible for a single server to include application software for performing many tasks, or for a single task to be handled by any number of server computers. In one embodiment of the invention, each task is handled by at least three physical servers. The number of servers depends upon the load on the system. The number can be as small as one server per function or as large as 100 per function.

Message correction system 60 accepts a voice file representing a message left by the user, a text file representing the speech recognition, and returns a corrected text file. Voice query system 70 accepts a text file representing the query left by the user and returns an answer to that query. User e-mail server 80 is any suitable server utilized by the user to handle his or her electronic mail. Recipient e-mail server 90 is any suitable server utilized by a person to handle his or her electronic mail.

SMS Gateway Provider 96 is a provider as is known in the art that provides gateway services to any of a number of mobile telephone networks for delivery of SMS messages. For example, provider 96 provides a service by which it delivers SMS messages to the mobile telephone of a recipient 98 by interfacing with mobile telephone companies such as Verizon, Vodafone, Sprint, et cetera. Server facility 40 includes an SMS gateway server 47 that has an SMS text message to be delivered to recipient 98. Gateway server 47 passes the SMS text message (along with appropriate data) over the Internet to gateway provider 96 for delivery. In one embodiment of the invention, the company Simplewire, Inc. is used as the primary gateway provider.

Figure 1B:
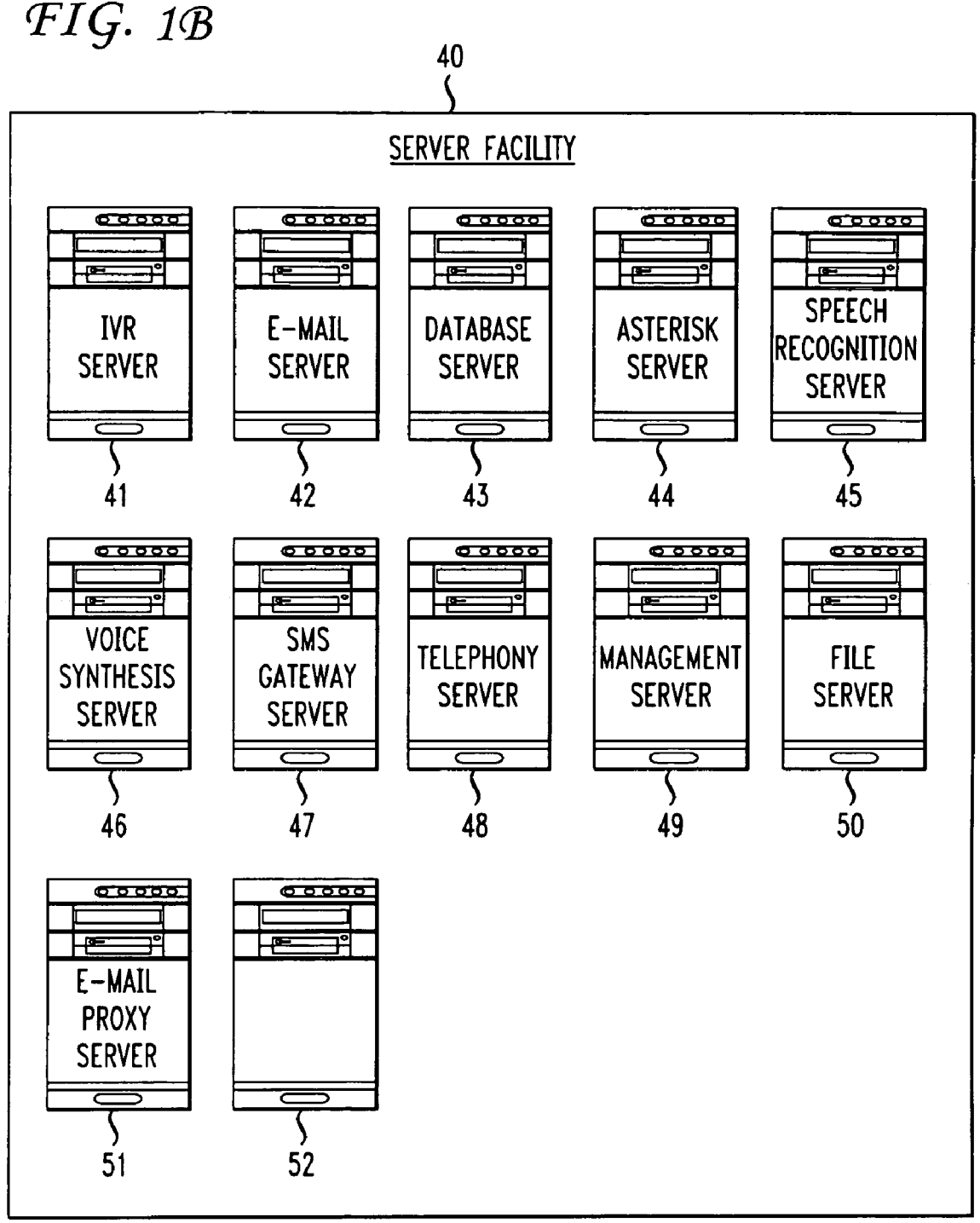
FIG. 1B shows one embodiment of server facility in which any number of servers are located at a central facility.

FIG. 1B shows one embodiment of server facility 40 in which any number of servers are located at a central facility. Server facility 40 includes management software for managing transmission system 10 in the flow of information between servers in the server facility. In one embodiment of the invention, this software resides on the management server 49 and is written in the computer languages C and Perl. The software package Cron is also used.

IVR server 41 includes application software for implementing an interactive voice response system in order to handle communications with user 20, and may be implemented using Asterisk software. E-mail server 42 include software for sending and receiving e-mail messages and may be implemented using Exim software. Database server 43 includes databases for text files, audio files, etc. and may be implemented using MYSQL database software. Asterisk server 44 is arranged to interface with the telecommunications lines to assist with recording of messages and to make outgoing telephone calls, and may be implemented using Asterisk software.

Speech recognition server 45 is arranged to perform speech-to-text conversion using any suitable speech recognition software such as that available from Nuance (formerly ScanSoft) or from AT&T and IBM. Voice synthesis server 46 is arranged to perform text-to-speech conversion using any suitable voice synthesis software such as that available from AT&T, IBM and Cepstral. As described earlier, SMS gateway server 47 is a repository for text messages to be delivered via SMS to a recipient with a telephone. Telephony server 48 is used to provide a gateway between the PSTN provider and the present system. It also provides a gateway between VoIP callers and the present system.

Management server 49 employs management software and (among other tasks) runs a script periodically to check for messages on database server 43 flagged as is being ready for delivery. For example, server 49 identifies text messages that are ready for delivery and hands them off to the e-mail server or to the SMS gateway server, etc., depending upon the requested destination. Or, server 49 identifies a voice file (a text file that has been synthesized using the voice synthesis server) and delivers it to the telephony server for a callback answer to be delivered to the user's mobile telephone. In one embodiment, the management software on the management server makes a check of the database server about every 10 seconds.

File server 50 is any suitable computer used for storing and retrieving files. E-mail proxy server 51 is a server computer and associated software used to retrieve a user's e-mail messages from a commercial e-mail service as described below.

In another embodiment of the invention the servers are distributed over three sites. These sites may include corporate offices of the company implementing the invention as well as any number of commercial hosting sites that provide space for servers and equipment. In one embodiment, there is normally one server for each function at each site. The separate sites provide geographical redundancy for the system.

Figure 1C:
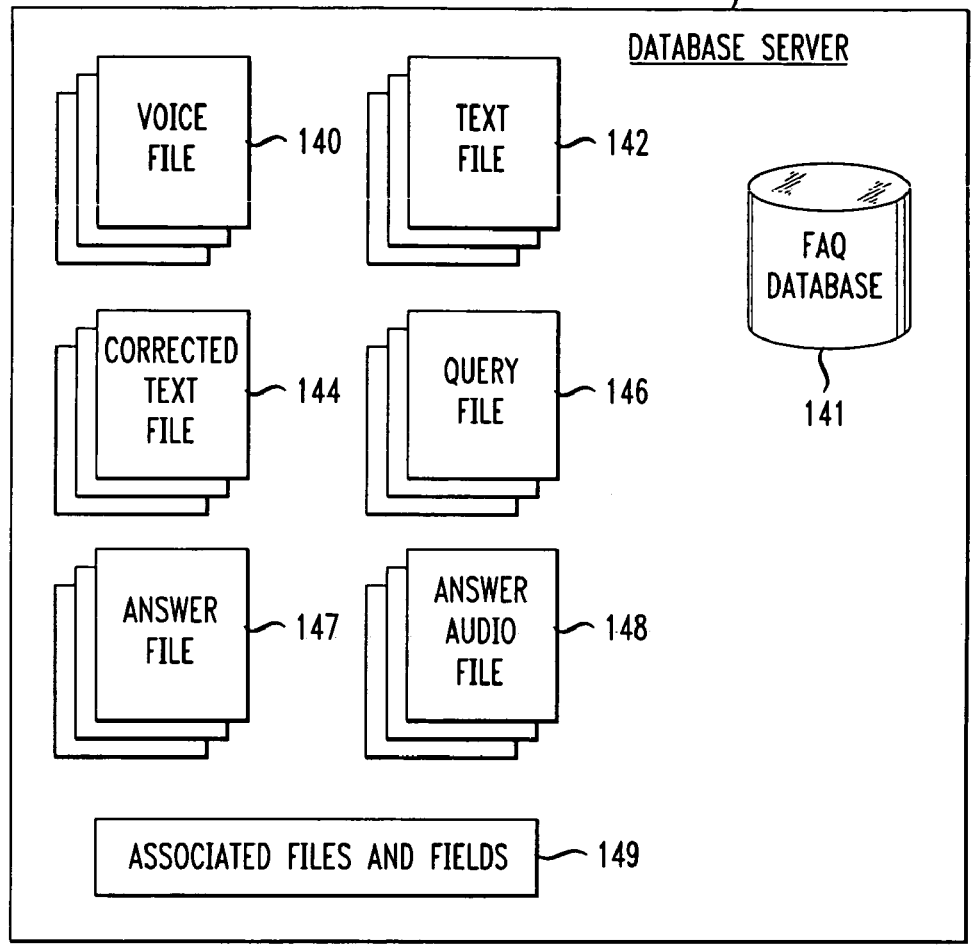
FIG. 1C is a block diagram of the database server.

FIG. 1C is a block diagram of the database server 43. Included within the database server are any number of voice files 140 representing voice messages left by users of the system to be delivered, any number of text files 142 that have been produced by the speech recognition software, any number of corrected text files 144 that have been produced by message correction system 60, any number of query files 146 that a user has submitted to be answered, any number of answer files 147 that have been produced by voice query system 70, any number of answer audio files 148 that have been produced by the voice synthesis server for delivery to the user, along with associated fields 149 that provide metadata for the above files as described below. Also included within the database server are files that make up fragmentation portions of a corrected text file before reassembly for situations in which a voice file is transcribed by any number of workers. Also included within database server 43 is an FAQ database 141 that has two basic fields: a first field listing a question asked by a user, and a second field listing the answer to that question. Of course, FAQ database 141 may also be implemented on its own separate database server or servers.

In embodiments of the message transmission system various of the above files will be related to another and associated with one another on the database server. For example, when a user leaves a voice message to be delivered to a recipient, the original voice file is associated with its corresponding text file and corrected text file. When a user asks a question of the system, the original query file is associated with the answer file. Further, metadata that identifies which user has submitted a particular voice file is produced and includes a unique user name and a record identifier. Such metadata is used to associate a voice file or other produced file with a specific user.

Figure 1D:
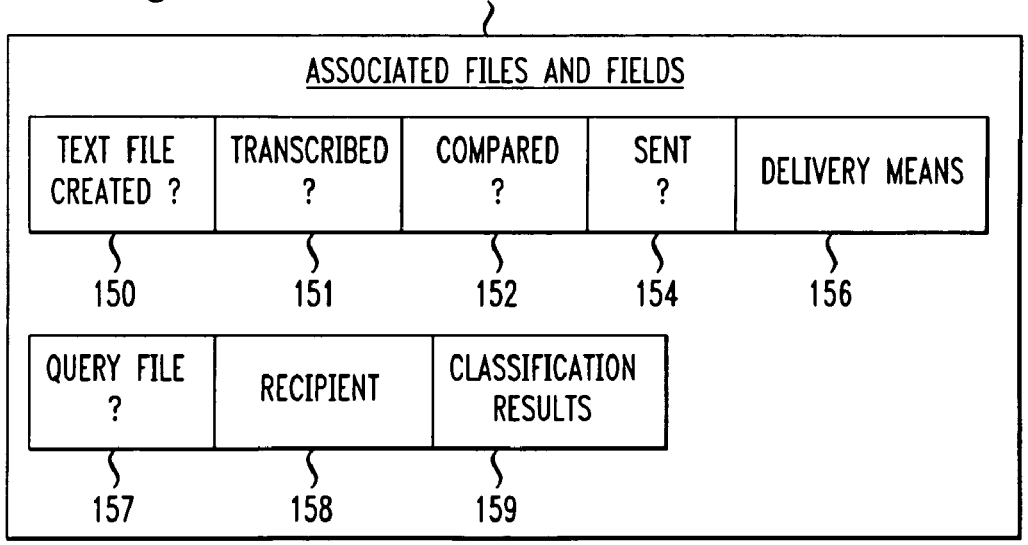
FIG. 1D is a block diagram illustrating the associated fields that are associated on the database server with particular sets of voice and text files.

FIG. 1D is a block diagram illustrating the associated fields 149 that are associated on the database server with particular sets of voice and text files. Flag 150 indicates whether or not a received voice file has been input to the speech recognition software to produce a corresponding text file. Flag 151 indicates whether or not a particular voice file (and its corresponding text file) have been transcribed by the message correction system in order to produce a corrected text file. Once a corrected text file has been uploaded to the database server, flag 152 is used to indicate whether or not the corrected text file has been compared to the original text file in order to update the user's profile in the speech recognition software. Flag 154 indicates whether or not a corrected text file has been delivered to a recipient, or whether or not an answer file has been delivered. Query flag 157 indicates whether or not the associated file is a query file that has just been transcribed or if the file is a corrected text file. A corrected text file is ready for delivery to the user while a query file is submitted to voice query system 70 for generation of an answer file. Once the answer file has been generated and uploaded this field may be reset indicating that the associated answer file is ready for delivery. Field 159 indicates classification results for a particular query file such as a single keyword ("sports," "entertainment") or a list of keywords.

Field 156 indicates a preferred delivery means that is specified by the user when a request is first generated. For example, for message delivery, the user will indicate e-mail, SMS, facsimile, printer, etc., as the means by which a voice message should be delivered to the recipient. For an Internet query, the delivery means may be any of the above including delivery to the user's telephone using voice synthesis. Recipient field 158 indicates the address of the recipient to whom the message will be delivered. For example, field 158 is an e-mail address, a telephone number of a telephone equipped to handle SMS, a facsimile number, a remote printer number, or a telephone number able to receive a synthesized voice message.

Speech Recognition and Message Delivery

Figure 2:
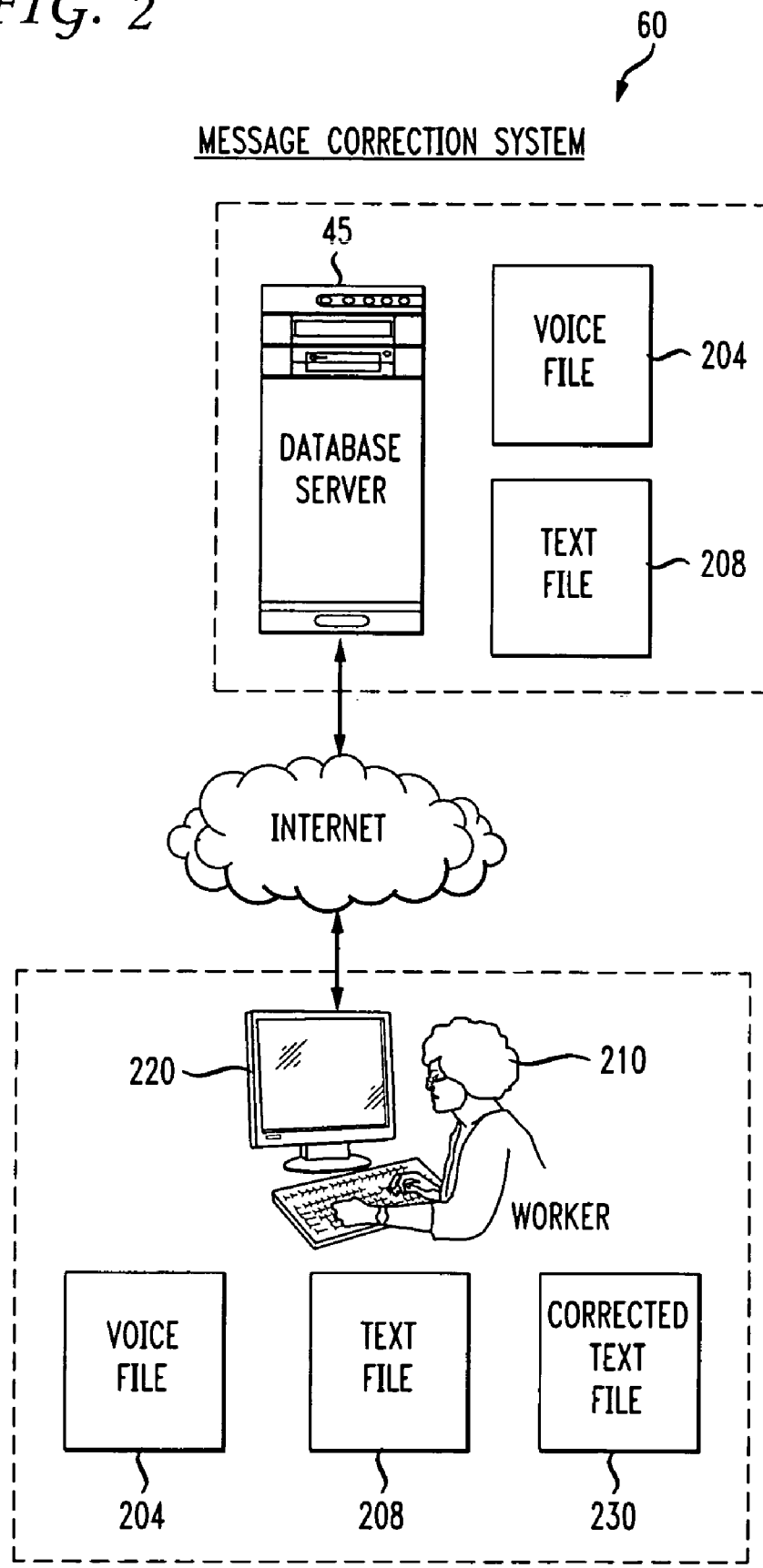
FIG. 2 is a message correction system according to one embodiment of the invention.

FIG. 2 is a message correction system 60 according to one embodiment of the invention. Message correction system 60 provides a voice file 204 and a text file 208 to a worker 210 who uses a computer 220 to produce a corrected text file 230.

FIG. 3 is a message correction system 60 according to another embodiment of the invention. Message correction system 60 provides a voice file 204 and a text file 208 to a series of workers in an assembly line-like process in order to produce a corrected text file.

FIG. 4 is a flow diagram describing how a voice message from a user is transcribed accurately. In step 304 user 20 dials a local access number (or connects using any of the methods shown in FIG. 1) and connects to an IVR server 41 at server facility 40. The user may dial in from any telephone. In one embodiment, the IVR server recognizes the telephone number from which the user is dialing using standard caller identification technology. If the user dials in from a telephone having a telephone number that has been previously registered as a login identifier during a sign-up process then the IVR server recognizes that telephone number; in this situation, the user need only then enter a personal identification number in order to gain access to the system. If the user dials in from a telephone that has not previously been registered, then the user is prompted for their login identifier (which is typically their registered telephone number) and their PIN. The system recognizes a telephone number from which a user is dialing using caller identification.

In step 308 the user interacts with the IVR server in order to make a particular choice. The user is offered a variety of choices: send an e-mail message or an SMS text message to someone in the user's address book; send an e-mail message or SMS text message to someone not currently in the user's address book; perform a voice query over the Internet; retrieve e-mail messages; switch to another account; or contact technical support. Assuming that the user decides to send an e-mail message or SMS text message, the user is prompted to enter the first three letters of a person's name currently present in the user's system address book. The user is then given the option to record a message to send.

If the user chooses an option to send an e-mail message or an SMS text message to a person not currently in the address book the user is prompted to enter that address. In the case of an SMS message, the user is prompted to simply type in the telephone number of that telephone. This means of delivery and telephone number are then entered into fields 156 and 158 of FIG. 1D. In the case of an e-mail message, the user is prompted to say and spell the e-mail address. This means of delivery is entered into fields 156 and the spelled e-mail address is recorded into a voice file and is transcribed by message correction system 60 in the same fashion that the subsequent voice message is transcribed for delivery as described immediately below. This voice file containing the e-mail address is also flagged as such in order to assist the speech engine in transcribing it; further, when this voice file and its corresponding text file is delivered to a user for correction the files are also flagged as containing an e-mail address so that the worker is better able to correct and format the text file. The user is also given the option to deliver a message electronically to another address such as a facsimile machine or a printer. The user may identify a facsimile machine by a telephone number and identify a printer by an IP address.

In step 312 the user's voice message is recorded by the IVR server as a voice file. In one embodiment of invention, the message is first recorded as a WAV file and then converted into MP3 format. The voice file 204 is then stored on database server 43 along with tags indicating the login identifier and the time of recording. The system also uses message fragmentation to split up voice recordings into small chunks and have those chunks sent to different agents or workers for transcription. Each agent transcribes only his or her chunk and sends the completed chunk (i.e., a text file) back. After all the chunks have been transcribed the system assembles the chunks into one text file. Other tags may be used to identify these chunks and these different agents. Once recorded, the user also has options of replaying the message, deleting the message, re-recording the message, sending the message or returning to the main menu.

In step 316 voice file 204 is sent to speech recognition server 45 in order to be transcribed into a text file 208. In an alternative embodiment of the invention, as the user is recording his or her message the voice transmission is routed directly to speech recognition server 45 such that an appropriate speech recognition engine may transcribe the message in real-time while the user is speaking. The message can also be routed to a person to provide translation. In a preferred embodiment though, recorded voice file 204 is created. Any suitable speech recognition software may be running on speech recognition server 45 to input voice file 204 and to output text file 208; the text file is also stored on the database server in association with the voice file. FIG. 4A describes speech recognition in more detail.

In step 320 the incoming voice message from the user is optionally classified and the results of the classification are also stored in association with the voice file and the text file on the database server. For example, the voice file may be classified according to: language, dialect, accent, or subject matter. Such classification enables workers having particular qualifications or desires to be matched with a suitable voice and text file. In one embodiment of the invention, a user makes a selection when interacting with the IVR server in order to indicate in which language the message is being recorded (i.e., press "1" for English, press "2" for Spanish, etc.). By default, it is assumed the message is in English. In another embodiments, each user has a profile that indicates their default language preference, or the language preference is set based upon number used to dial into the system.

Classifying a voice message by language enables messages in a particular language to be routed only to those workers who have proficiency in that language, or allows such workers to indicate which messages will be suitable for them. Dialect can also be an important classification as certain dialects of a particular language can often be difficult to understand even to a speaker of that language. For example, a Scottish dialect of English might be difficult to understand for an individual in the United States who otherwise thought they had a good command of the English language. Dialect may also be indicated by the user as above using the IVR server. Accent refers to that particular speech pattern associated with a non-native speaker of a particular language. For example, a German speaking English might be said to speak English with a German accent. Using accent as an additional classification may also be useful in certain circumstances. Accent can also be indicated by the user using the IVR server. Any classifications determined from user input or by review of the voice file are stored in association with the voice file and text file on the database server.

At step 324 a worker or any number of workers logs in to message transmission system 10 in order to assist with verification and correction of the voice and text files. The embodiment of FIG. 2 shows a single worker correcting the text file, while the embodiment of FIG. 3 shows three (or any number of) workers assisting with correction of the text file. By default, it is assumed that the voice file and the text file are in English and that each worker is qualified and desires to assist in correcting in English. In the embodiment in which the message classifications are used, each worker also inputs his language qualifications and language desires. For example, a worker may input that he can handle a language such as English or Vietnamese, may input a particular dialect or accent he or she is qualified to handle, and may also input a desired language to handle. For example, a worker who is qualified to handle English and Spanish may be allowed to indicate a desire for only handling messages in English for a particular session.

In step 328 the qualifications and desires of the worker are accepted by the server and database server 43 performs a screening of available text files for correction using the qualifications input by the worker. For example, if the worker indicates a qualification and desire to correct English text files then the database server selects all those text files having an English qualification tag and selects one to be downloaded to the worker's computer. In one embodiment, an available text file is selected based upon its time and date of entry into the system; i.e., first in first out. Both the text file 208 and its associated voice file 204 are downloaded to the worker's computer.

The embodiment of FIG. 2 will be discussed first. In this embodiment a single worker 210 uses his or her computer 220 in order to produce a corrected text file 230 based on voice file 204 and text file 208. As speech recognition software is not 100% perfect and it is likely that text file 208 will not be a perfectly accurate transcribed version of voice file 204. In this situation, worker 210 has various means at his or her disposal for correcting the text file so that it matches the voice file. As the files have been downloaded to the worker's computer, the worker can easily open the text file in a suitable word processing program and then open the voice file and listen to it either over headphones or computer speakers. Typical software used by the worker includes a web browser and any operating system that will run it. The operating system may be Windows, Linux, Apple, etc. The web browser may be Firefox, Mozilla, Internet Explorer, Safari, etc.

The worker first quickly checks whether the voice file heard matches the text file on screen. In the simplest case, the text file will match and the worker will send a message back to the system indicating that text file 208 is suitable for delivering. In one embodiment, the worker submits the file directly using an SQL statement, either encrypted or not encrypted.

Assuming that the text file does not match, the worker can, by typing, quickly correct any minor errors in the text file on screen thus producing a corrected text file 230. Preferably though, the worker uses speech recognition software on his computer in order to speak the desired corrections directly into the text file thus producing the corrected text file. The worker has the opportunity to replay the voice file as necessary or to listen to selected portions of it. Any suitable speech recognition software may be used; in one embodiment the speech recognition software on the worker's computer is the same is that on speech recognition server 45.

Even if the worker uses speech recognition in order to correct the text file, it is possible that this technique might not produce the desired text. In this situation, the worker also has the option to simply type in the text as it should appear, based upon the voice file. As the worker constantly uses the speech recognition software on his or her computer, he or she constantly makes corrections using the software and otherwise improves its performance in a manner allowed by the software. In this fashion, correction by the worker using the speech recognition software will constantly improve because the software learns the user's voice and builds up a user profile. Once a corrected text file 230 has been produced, the worker uploads it to database server 43 along with an indication that this is a corrected text file that corresponds to the original voice file 204 and text file 208. At this point the worker may log out or indicate to the database server that he or she is ready to correct another pair of files.

FIG. 3 shows another embodiment of message correction system 60 in which an assembly line-like process is used to correct a text file. In this embodiment, any number of workers (in this case, a checker 242, a speaker 244 and a typist 246) are arranged in a sequential process of three stages where each worker utilizes a particular skill to process the text file. In this example, a series of three workers are used to produce a corrected text file, although two workers may used or even more than three. Each worker has logged in to the system as previously described in step 324 and each has a language qualification that matches the voice file to be processed.

In step 332 checker 242 downloads voice file 204 and text file 208 from database server 43 over Internet link 280 to his or her computer. Next, the checker simply compares the voice file that he or she hears to the text file that appears on screen. If the text file is correct the checker provides a suitable indication back to the database server and the correct text file 208 is uploaded to the database server in step 348. Correction of this text file is now complete. If the text file is not correct, then the checker indicates to the database server that further correction of the text file is necessary. The only skill needed by the checker is the ability to listen to the voice file and to read and compare the text file. The checker need not have any typing, speaking or dictation skills. Further, it is not necessary for the checker to have speech recognition software or even a full keyboard, although those may be optionally available. A text file that is not correct is quickly passed on to the next stage in the assembly line process, speaker 244. The checker indicates to the database server a text file that is not correct by modifying the status flag field of the message in the database server.

In the second stage, speaker 244 is provided the voice file and text file from the database server along with an indication that further correction, and likely dictation, is necessary. The skill that speaker 244 has is the ability to dictate clearly, to use speech recognition software, and to improve that software. As the speaker knows that he or she is part of the second stage, he or she can immediately begin to identify errors in text file 208 by reading it and also by listening to voice file 204. The speaker then uses speech recognition software on his computer to produce a corrected text file 258. Although not required, the speaker may also perform minimal typing to correct minor errors if necessary. The speech recognition software also produces a clean voice file 254 which is a recording of the words spoken by speaker 244. Alternatively, additional software on the speaker's computer records the words spoken by the speaker to produce the clean voice file. Clean voice file 254 may contain words or phrases spoken by the speaker, or may contain a recording of the complete message as dictated by the speaker. In one embodiment, a clean voice file is produced by first saving it as an audio file and then uploading it to the file server and then recording it in the database server.

If the speaker is satisfied in step 340 that the corrected text file now matches voice file 204 (i.e., errors in the text file have been corrected) then the speaker uploads corrected text file 258 back to the database server over Internet link 282 in step 348. If the speaker has been unable to completely correct the text file through dictation, the speaker also uploads the corrected text file along with an indication that further correction is necessary. In this fashion, the speaker utilizes dictation skills to constantly improve his or her ability to use the speech recognition software present on his or her computer; the speech recognition software will gradually improve such that most all errors can be corrected by the speaker.

If the text file has not been fully corrected, then a typist 246 is used in a third stage to complete correction of the text file. The typist downloads from the database server over Internet link 284 the corrected text file 258 that needs further correction and the clean voice file 254 that had been produced by the speaker. As the speaker had been attempting to correct the text file through dictation, clean voice file 254 is a very clear recording of exactly how the speaker had been attempting to correct the file. The typist listens to the clean voice file, reviews corrected text file 258 (that contains errors) and then types corrections into the file to create a new corrected text file 268 in step 344. There is no need for speech recognition software on this computer, and the only skill needed by the typist is the ability to review the voice file and text file and to type quickly and accurately. Once the typist has created the new corrected text file 268 he or she uploads that file back to the database server over the Internet link in step 348. Preferably, the typist receives only the clean voice file and the associated text file, although the other files may also be transmitted to the typist.

In the situation where corrected text file 268 represents an e-mail address that the user has entered for delivery of a corresponding text file, this transcribed e-mail address is then placed into recipient field 158 corresponding to the particular text file. In this fashion, a user is allowed to enter virtually any e-mail, SMS, or telephone number address on the fly as he or she is recording the voice message for transcription and delivery.

By using the above assembly line-like process, workers with certain skills are used in particular stages in order to maximize their efficiency and to maximize the accuracy of their work. Further, special computer hardware and software is only needed in particular stages according to the task that each worker will perform. Further, a given message may be sent to more than one worker or agent at a time in order to ensure accuracy or speed in translation, thus allowing real-time translation to occur, for example, using the embodiment shown at FIG. 6B. Also, instead of a voice file being recorded and delivered, streaming audio may be used to deliver the user's spoken voice in real time to an agent for processing. Also, a single voice file may be broken into message fragments that are sent to more than one worker or agent at the time. Once transcribed, the text message fragments are reassembled into a whole text file. Such fragmentation also allows for faster speed and real-time translation, and also ensures the confidentiality of a given message. For example, a message that includes a user's login name and password may be split into two different messages for transcription; the first part of the message including the login name goes to one agent, and the second part of the message including the password goes to a different agent.

FIG. 4A is a block diagram showing one embodiment of a speech recognition process. In another embodiment (not shown), a single speech engine is used to transcribe voice file 204 into text file 208. Any suitable speech recognition software may be used such as Dragon NaturallySpeaking (version 8) available from Nuance (formerly ScanSoft, Inc.), ViaVoice (version 10) available from IBM, or Sphinx open source speech recognition (version 4) available from CMU. When a single speech engine is used, the Sphinx speech engine has been shown to work particularly well.

In the embodiment shown in FIG. 4A, voice file 204 is fed into two speech engines 370 and 372. In this embodiment the Dragon NaturallySpeaking and the IBM ViaVoice speech engines are used. Output from speech engine 370 is a first text file 374 and accuracy information 375; output from speech engine 372 is a second text file 376 and accuracy information 377. Using these speech engines to produce a transcribed text file is a technique known to those of skill in the art. Each speech engine uses sophisticated algorithms along with grammar checking software to produce its best guess as to the content of the output text file. As is known in the art, each speech engine also outputs accuracy information along with each text file. The accuracy information is a list of those words, phrases or sentences that the speech engine believes might not be correct, along with an estimate as to how accurate it is believed that the word or phrase represents its spoken counterpart. For example, when transcribing the spoken word "for" a speech engine might indicate that it believes a transcribed output of "for" is 95% accurate but that an alternative of "four" is 60% accurate.

In one embodiment, each word has a percentage accuracy associated with it. This number represents how confident the system is that the word is the correct word. This judgment is based not only on the transcription of the audio file, but also on a grammatical analysis. The system looks at the whole sentence or phrase and checks to see if it makes sense grammatically with the given word.

As each speech engine outputs accuracy information for the same transcribed voice file, a comparison may be made using comparison software module 380 of the words, phrases or sentences that have questionable accuracy (i.e., those words the speech engine thinks it might have gotten wrong). For example, if the first speech engine flags the phrase "transcribe voice file" with an 80% accuracy but the second speech engine thinks the phrase ought to be "transcribed voice file" and gives it a 90% accuracy, then the comparison module simply chooses the second phrase because it has a higher believed accuracy rating.

The comparison module steps through each word (or phrase grouping) sequentially in the input text files and compares the accuracy information for each word or phrase. The word or phrase from the speech engine with the highest accuracy is chosen and is used to complete the output text file 208. Words or phrases that each speech engine indicates are likely correct and are the same are simply output to text file 208. For a given input word or phrase, if the speech engines differ on a chosen transcription, then that transcription with the highest believed accuracy is selected to be included in the text file 208. The speech engines can identify that two words output from the two speech engines correspond to the same spoken word in the voice file by using a time index. Each speech engine produce a time index so that a translated word is identified as corresponding to a position in the audio file. The comparison module does not necessarily need the audio file, it does a text-to-text comparison.

In this fashion, text file 208 is produced using a hybrid of two different speech engines and has higher accuracy. In other embodiments three or more speech engines may be used to produce text files that are also compared against one another in a comparison module using the above-described technique.

FIG. 5 is a flow diagram describing a process by which the corrected text file is delivered to a recipient. Previously, the corrected text file has been uploaded to the database server and an associated flag has been set indicating that the corrected text file is ready to be delivered. Periodically, software on the management server will make a pass through files on the database server, realize that the corrected text file has been recently uploaded and will take the following action. In step 350 the corrected text file is compared with the original text file produced by the speech-to-text engine.

FIG. 5A is a block diagram showing one technique by which text files are compared and a user profile is updated. As shown, speech engine 390 had originally produced text file 208 based upon voice file 204 that was input by the system user. Corrected text file 268 has been produced using message correction system 60. Management software now takes both the original text file and the corrected text file from the database server and provides them as input to speech engine 390 on the speech recognition server. It is assumed that the corrected text file is a correct version of the voice file; the speech engine is thus directed to assume that the corrected text file is the correct version of the text file. The speech engine now learns which words or phrases it had transcribed incorrectly initially and notes these results. In one embodiment, the system performs a text-to-text comparison of the two files. The differences are recorded in a profile that is read by the speech-to-text engine.

Once the speech engine has processed both files and is aware of its mistakes in transcribing the original voice file from the user, in step 352 the speech engine builds a user profile 392 for that user to help in identifying spoken words and phrases and their corresponding textual representations. Each user of the system has a corresponding user profile for each type of speech recognition software used by the system. Each brand of speech engine uses a particular known technique for creating, building and updating user profiles. The user profile for a particular user is preferably stored on speech recognition server 45 in association with the particular speech recognition software used. In the embodiment where two different speech engines had been used a composite is taken of the results and put into both engine's profiles.

In step 354 the management software monitors the results of the file comparison to determine how accurately the speech engine originally transcribed the voice file. If the speech engine reaches a certain level of accuracy then at that point text file 208 need not be delivered to message correction system 60 for correction but may be flagged as being ready for immediate delivery to a recipient. In one embodiment, a certain percentage accuracy indicates that the text file need not be further corrected. In one embodiment, a percentage accuracy is determined based upon a simple one-to-one comparison of words; a percentage is created from that. This information is stored in the profile created for each user. In step 356 the corrected text file is formatted and then routed to the appropriate delivery means for delivery to the recipient.

Management server 49 scans the database periodically for corrected text files that are indicated as being transcribed and already compared, but not yet sent. Once such a file is found the delivery means field 156 is checked to determine how to deliver the corrected text file; the file is then sent to the appropriate server along with recipient field 158 that contains the address of the recipient. For example, for e-mail delivery the corrected text file and the e-mail address are delivered to e-mail server 42; for an SMS message the text file and SMS telephone number are delivered to SMS gateway server 47; for a facsimile the text file and the facsimile number are delivered to a facsimile server (not shown) within server facility 40; for printed delivery the text file and the telephone number of the printer are delivered to a printer server (not shown) within server facility 40. Alternatively, the text file is sent to the remote printer using an IP address in the same format that a computer would use.

In a situation where an Internet query was submitted and an answer file has been prepared for delivery to the user the management software first checks the delivery means. If the delivery means is textual (for example, by e-mail or SMS) then the answer file in the appropriate address is delivered to the appropriate server. If the user has requested a voice response be delivered to his or her telephone then the management software first sends the answer file to the voice synthesis server for creation of an answer audio file. The answer audio file and the user's telephone number are then delivered to telephony server 48 that calls the user back and plays the audio file when the user picks up the telephone. If voice mail picks up then the answer file is recorded on the voice mail.

In each of the above situations standard software and known techniques are used by each of the various servers (e-mail server, gateway server, facsimile server, telephony server, etc.) to deliver a message to a recipient (either textual or voice) once the appropriate file and recipient address have been delivered to the server. For example, the facsimile server uses standard technology to take an electronic text file and to send that file to a facsimile telephone number that the remote facsimile machine will understand as a facsimile transmission.

In step 358 numerous cleanup tasks are performed at the completion of message delivery. For example, the original audio file from the user (for example, a voice file or a query file) is stored on file server 50 for later reference. In this fashion, a user may call into the system and request that their original audio files be played back to them for assistance in formulating new messages or queries.

Voice Query System and Answer Delivery

Figure 6A:
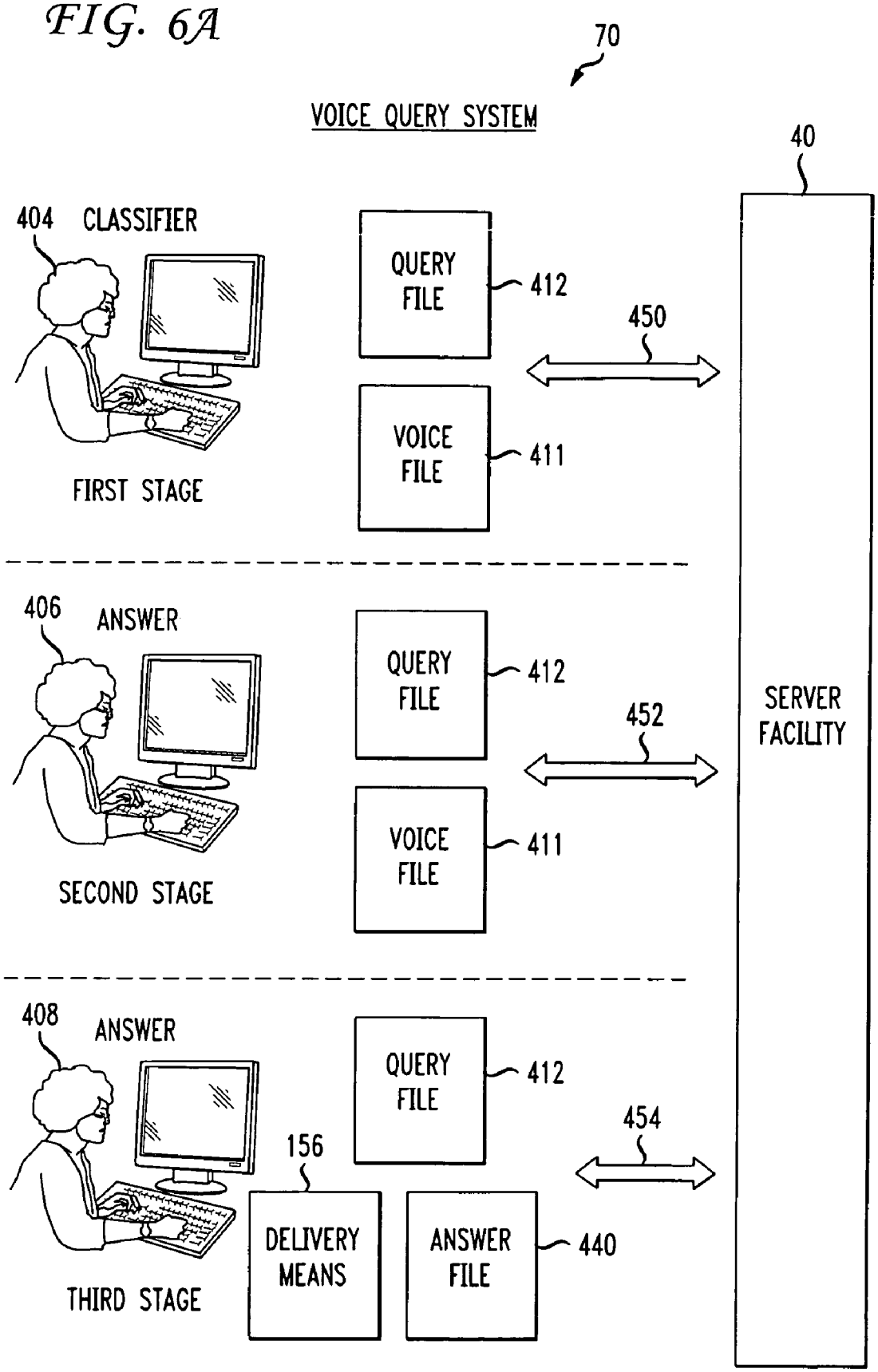
FIG. 6A illustrates the voice query system according to one embodiment of the invention.
Figure 7:
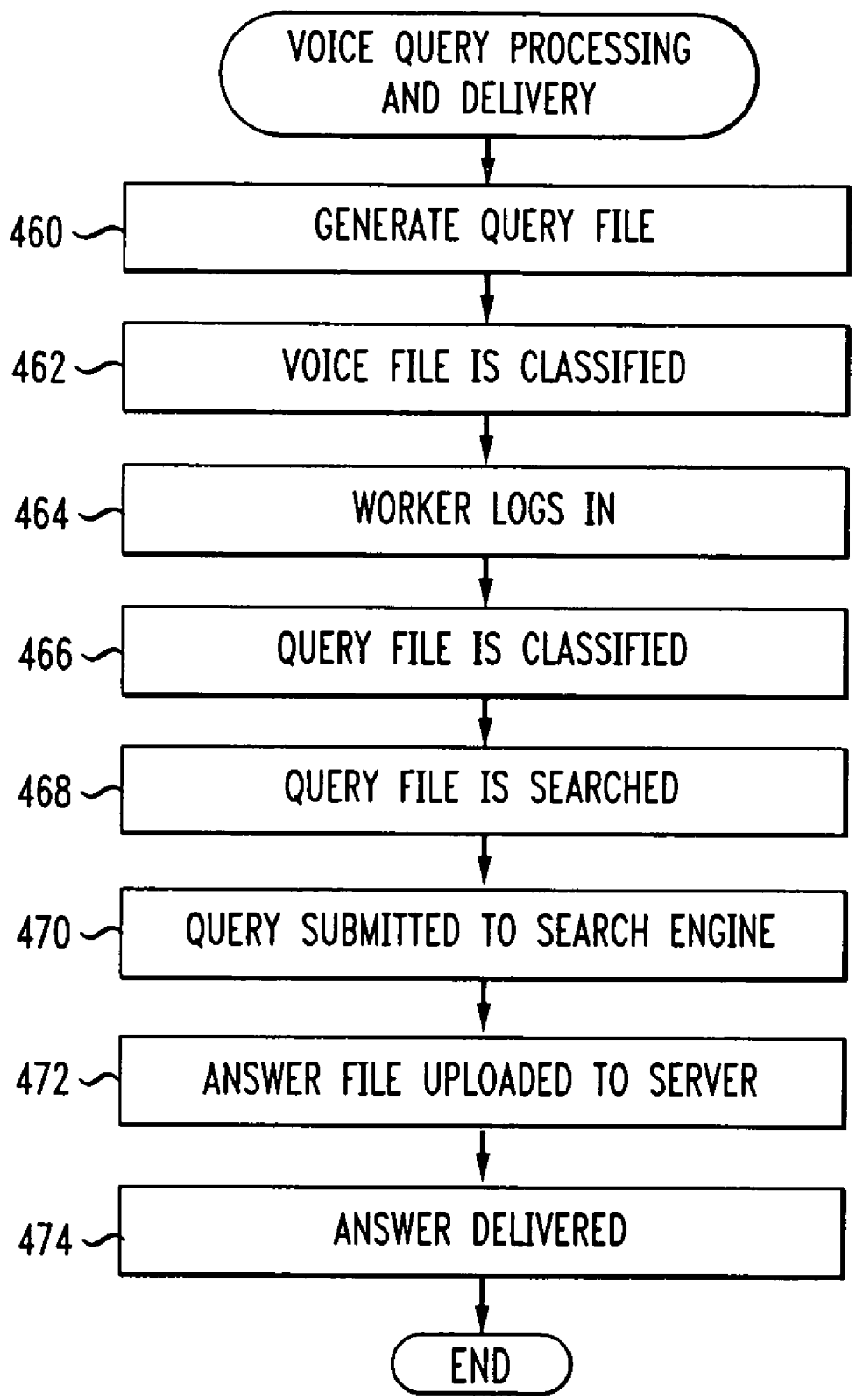
FIG. 7 is a flow diagram describing how the system determines an answer to a query and responds to the user.

FIG. 6A illustrates voice query system 70 according to one embodiment of the invention. Shown are three stages by which a series of workers in an assembly line-like process determine an answer to a query by a user and provide a response. Of course, only a single worker may be used to process a query and provide an answer, or greater than three workers may also be used in a similar type of serial process. FIG. 7 is a flow diagram describing how the system determines an answer to a query and responds to the user.

In this embodiment of the invention, a user accesses message transmission system 10 and asks a question of the system and directs the system provide him an answer by a particular delivery means. In step 460 a textual query file 412 is generated and stored on the database server in association with an original voice file and associated fields. The query file is preferably generated in the same fashion that corrected text file 268 is generated, i.e., by having the user access the system, submit a voice file and by transcribing the query file according to steps 304-316 of FIG. 4. Once the query file has been stored on the database server flag 157 is set and the management software will deliver the query file to the voice query system 70 at the appropriate time.

In step 462 the incoming voice file is classified according to the field of the query. After the voice file is transcribed by the speech recognition software the voice file is also input to specialized speech recognition software on server 45 that recognizes keywords in the voice query and generates a list of written keywords that best classifies the nature of the question. Alternatively, the speech recognition software that transcribes the voice message is also arranged to extract keywords and provide the list. Or, the voice file may be fed through a keyword extractor immediately before input to the speech recognition software. In one embodiment, the keywords are provided by a simple text comparison software. After conversion to text the transcribed text is compared to a general keyword list. Based on a result of that comparison a keyword list for that voice file is generated. In another embodiment, the query file is input to custom software that can extract a list of written keywords in an attempt to classify the question.

In step 464 a worker (or any number of workers) logs in to the system for the purpose of answering queries as previously described in steps 324 and 328. In step 466 the management software periodically polls available files in the database, notices that query file 412 is ready to be processed by voice query system 70, and delivers voice file 411, query file 412, and classification results 159 to a first worker, classifier 404, over Internet connection 450. Classifier 404 reads the query file on his or her screen (i.e., the question asked by the user), reads the list of supplied keywords, and either confirms the classification provided by the keywords or makes modification based upon the written query and his or her experience. The classifier may also make use of the original voice file 411. In one embodiment, the classifier distills the list of keywords into a single keyword that accurately classifies the nature of the question. It is possible that the classification provided by the earlier classification software need not be changed. When finished, the classifier uploads the new classification back to the database server. The management software then receives an indication that the classifier has finished his or her work, updates classification results 159 and prepares to send query file 412 to an appropriate answerer 406 according to the new classification.

In step 468 the management software delivers voice file 411 and query file 412 to an appropriate answerer 406 over Internet connection 452. The management software attempts to match the worker's qualifications with classification results 159. This worker listens to the original voice file, reads the query on his or her screen, and may edit the query so that it is in an appropriate form for submission to a search engine. Answerer 406 is experienced in formulating queries so as to receive fewer number of answers that are relevant. Next, answerer 406 uploads the adjusted query file 412 back to database server 43 for searching in the FAQ database 141. Appropriate software receives the query, searches the FAQ database for any number of similar queries, and returns as results the answers to those queries that best match the query in the adjusted query file. These answers are then delivered to answerer 406 and appear on his or her screen. This person then reviews the answers and attempts to determine if one of them is the answer to the original question. In one embodiment, a commercial search engine is used for this purpose.

Assuming in this situation that this worker cannot determine an appropriate answer, he or she indicates as such to the management software back at the server facility. Alternatively, if this worker is attempting to answer the question but cannot do so within a specified period of time (e.g., three minutes), a timeout occurs, the worker is informed that his work is finished for that question and the management software takes control.

In step 470 the management software submits the adjusted query file 412 to another worker in the series who submits the query to a search engine. As a search of the FAQ database was not fruitful, the management software is aware that the query now needs to be submitted to an answerer 408 who has expertise in performing an Internet search of the query and in determining an answer. Query file 412 is delivered to answerer 408 over Internet connection 454 along with delivery means field 156. Answerer 408 reads the query file, edits slightly if necessary, and submits the query to any suitable search engine on the Internet. This worker has expertise in formulating Internet queries and in rapidly determining the answers to questions. Once an answer is found, he or she creates answer file 440 in any suitable fashion: by dictating a response using speech recognition software on his computer, by typing in a response, and/or by cutting and pasting text and then editing it. Based upon delivery means field 156, the worker may also reformat the answer for appropriate delivery to the user. The answer file 440 is then uploaded to database server 43 and the appropriate flags are then set or reset in associated fields 149 to indicate to the management software that this answer file is now ready for delivery to the user.

In step 474 the answer file on database server 43 is delivered to the user, for example, as previously described in step 356. The original voice file 411 and the answer file 440 are also stored on a file server so that a user may later search through these files.

In this fashion, a question from the user can be answered by any number of workers in an assembly line-like process where each worker has a particular expertise and can be reimbursed based on that expertise. Further, each subsequent worker in a series of workers may have a higher lever level of expertise so that as questions become more difficult to answer the query is escalated to a next higher level were a worker has greater expertise (and is correspondingly paid more). Thus, not only do workers interact with software and databases in order to answer a question most efficiently, but also they are compensated according to the expertise and ability to answer questions.

When the user initially logs in to the system the user also has the option of playing back any previous searches that the user has recorded. During interaction with the IVR server the user selects an option to list any previous searches. The user then selects a previous search to hear and the appropriate voice file 411 that the user originally recorded is played back to him over the telephone.

Figure 6B:
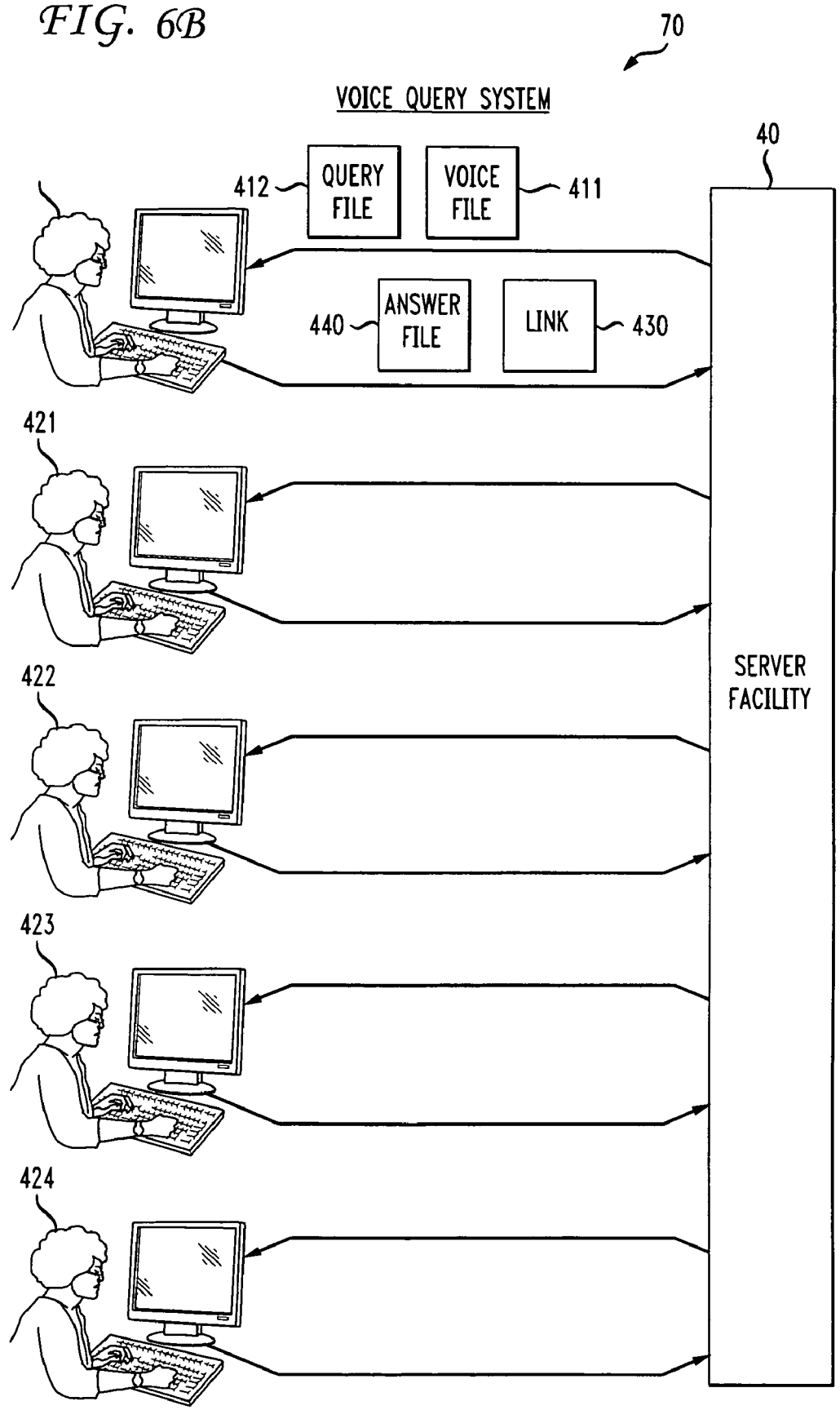
FIG. 6B illustrates an alternative embodiment of voice query system in which the user's query is processed and answered in real-time in parallel by any number of workers.

FIG. 6B illustrates an alternative embodiment of voice query system 70 in which the user's query is processed and answered in real-time in parallel by any number of workers. Any number of workers or agents 420-424 are connected to server facility 40 over an Internet connection and can process the query in real time using their computers. Each agent receives query file 412, voice file 411 and returns an answer file 440 or a link 430 to a web site that contains the answer to the user's query.

In operation, each agent has logged into the system and various of the agents will be waiting for a query to arrive. When a user accesses the message transmission system and indicates they wish to submit a query the system immediately determines which agents are logged in and are available to answer a query. Preferably, it is not necessary for the system to engage in a back-and-forth communication with each agent to determine if the agent is ready at that exact moment to field a query. As soon as the user starts speaking the query, the query is transmitted by the message transmission system to any number of agents in real time as streaming audio. At the same time, the query is also being recorded into a voice file and is being transcribed by a speech engine. In this fashion, multiple agents are listening to the query as the user is speaking it (perhaps with a slight lag time due to communications delays) and each can begin to understand the query and what might be an appropriate response. Soon thereafter (on the order of a few seconds) the speech engine (or engines) has transcribed the query and also submits the textual query file to each agent for viewing. Thus, each agent can verify what they have heard by reading the transcribed text of the query.

Once the speech engine has created the query file, software in the speech engine (or downstream of it) extracts relevant keywords from the query. These keywords are used to determine whether a particular search engine or web site should be used to answer the query. For example, a weather-related query may indicate that a search engine such as Yahoo should be used, a movie-related question may indicate that a particular movie web site should be used, while a map-related question may indicate that MapQuest should be used. It is known that certain search engines perform better at (or specialize in) certain types of queries so a particular search engine may be chosen based upon the relevant keywords.

Once a relevant search engine or engines has been determined, software on the management server or speech recognition server submits the user's query to the search engine. In one embodiment, the query is only submitted to one search engine, although it is also possible to submit the query to multiple search engines to get different results. The search engine or engines will return a list of web site links. The top links will be distributed to the available agents over their Internet connection. Each agent will receive a single link; if there are five agents available, the top five links will be distributed, one link to each agent. In another embodiment, the top three links from each search engine used (for example) will be distributed to the available agents, one link each. In this fashion, the top, most relevant links will be viewed by different agents in parallel, in real time immediately after they have finished listening to and reading the user's query. It is also possible to send more than one link each agent, although one link per agent allows each agent to return a result more rapidly.

Thus, immediately after listening to the user's query in real-time audio, and agent receives the text query for confirmation, and then automatically receives a link inserted into the Internet browser running on their computer that might provide an answer to the query. Next, the agent quickly reviews the link or clicks on the link and views the web site or content. If the link or web site does not provide an answer to the query or is otherwise not relevant than the agent clicks on a "No" button and a corresponding message is immediately sent back to management software at the server facility. The agent will then determine a few relevant keywords from the query and performs his own search using an Internet browser on his computer. If an answer is found, the agent clicks a "Yes" button and delivers the answer as described below.

If the link looks promising, the agent clicks on the link and reviews the content of the web site for an answer to the users question. When an answer is found, the agent highlights, cuts and pastes, or otherwise marks the content for the answer, and sends this text back to management server within answer file 440. Alternatively, the agent slightly edits the content and sends it back in the answer file. Once management software at the server facility receives any number of answers from any number of agents, the management software delivers the answer to the user using the delivery means specified as described above.

In an alternative embodiment, each agent would receive the top, most relevant links. For example, each agent receives the top five links. Once each agent responds, the link that is chosen most often by the agents is deemed to contain the correct answer. The answer provided from content at that link is then delivered to the user.

In this fashion, this alternative embodiment of the voice query system allows the user's query to be processed in real-time, in parallel, by any number of agents, thus providing a faster, more accurate result.

E-Mail Retrieval System

Figure 8:
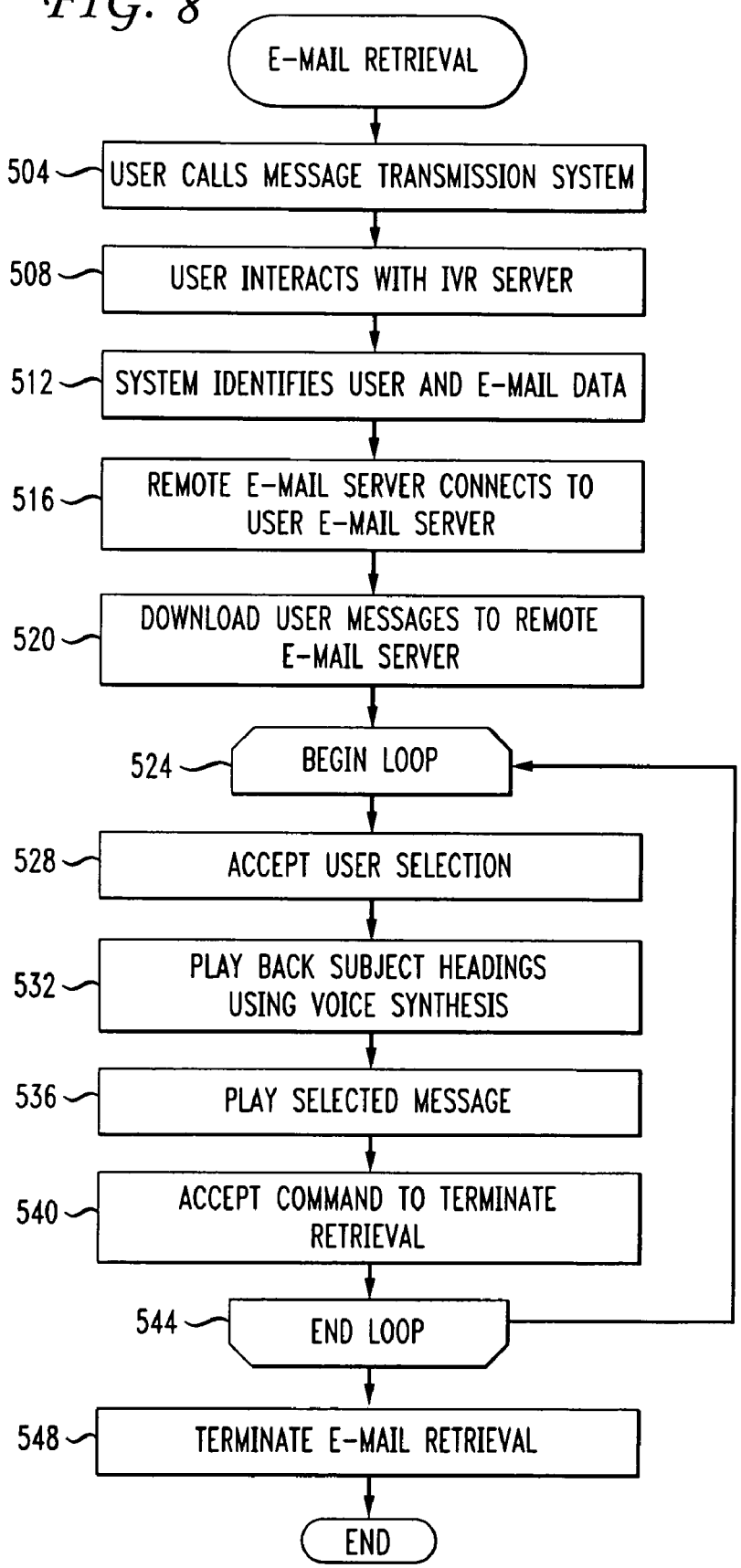
FIG. 8 is a flow diagram describing one embodiment by which a user's e-mail messages are retrieved and played back to him over his or her telephone.
Figure 9:
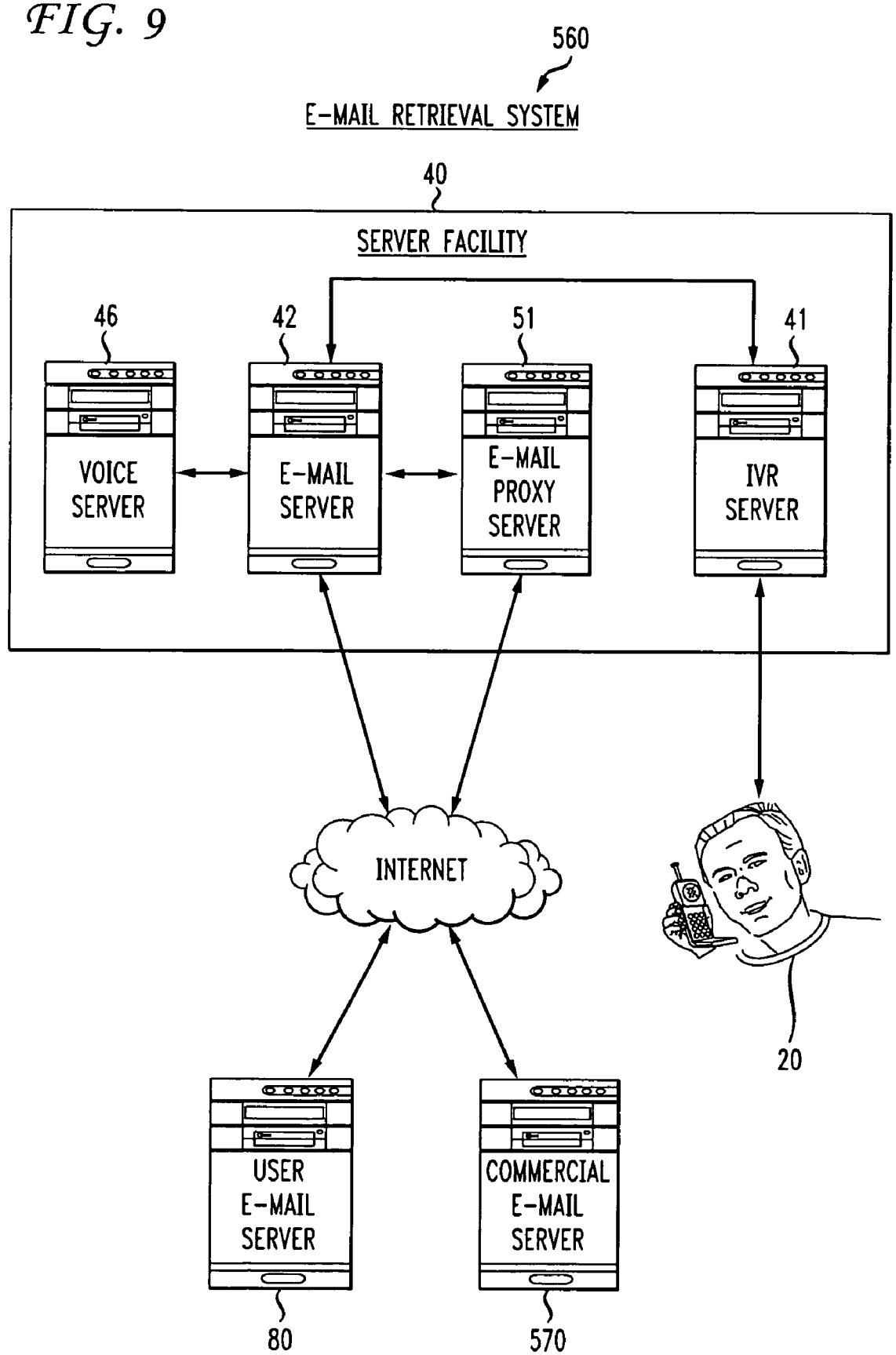
FIG. 9 is a block diagram of an e-mail retrieval system according to one embodiment of the invention.

FIG. 8 is a flow diagram describing one embodiment by which a user's e-mail messages are retrieved and played back to him over his or her telephone. FIG. 9 is a block diagram of an e-mail retrieval system according to one embodiment of the invention. Using system 560 a user 20 is able to call in to message transmission system 10 using his or her telephone and have his or her e-mail messages retrieved automatically and read back using voice synthesis.

In steps 504 and 508 a user calls in to the message transmission system and interacts with the IVR server in order to be identified as previously described in steps 304 and 308. In step 512 the system identifies the user and his or her associated e-mail information such as the address of the user's e-mail server, the login name and password, any nonstandard port, the protocol used (POP or IMAP) and whether or not the user's e-mail server requires SSL. This information is retrieved from the user's profile that has been submitted during a previous sign-up process.

The system also identifies whether the user's e-mail server is a typical server associated with the user's place of work that uses the standard POP or IMAP protocols, or whether the user is using a commercial e-mail service 570 such as America Online, Comcast, EarthLink, Hotmail, Yahoo, or Gmail from Google (often a free service).

In step 516 e-mail server 42 connects to the user's e-mail server (either server 80 or server 570). If the user's e-mail server 80 is using one of the standard protocols then e-mail server 42 can connect directly to that server over the Internet and use the standard protocol to retrieve the user's e-mail messages. If the user is using a commercial service 570 then e-mail server 42 requests e-mail proxy server 51 to connect over the Internet to server 570 to retrieve the user's messages. Proxy server 51 is a computer server running Freepops software available from www.freepops.org.

Proxy server 51 automatically connects to the web site where the user's e-mail is located (for example, "mail.yahoo.com"), emulates a person accessing the site, and downloads the user's e-mail to proxy server 51 and then on to e-mail server 42. In the case of server 80, e-mail server 42 connects directly to that server over the Internet and downloads the users e-mail messages to e-mail server 42 in step 520.

In a situation where a user is using a commercial e-mail service 570 but has upgraded that service (usually by making a monthly payment) then the user's e-mail messages may be available from server 570 using the POP or IMAP protocols. For example, Google offers POP3 access for upgraded accounts. The system recognizes these upgraded accounts by having user input different connection information.

Once the user's messages have been downloaded to e-mail server 42 the system prepares to play back those messages to the user by first sending the subject headings to voice synthesis server 46 to have those headings synthesized into individual voice files. Preferably, the subject headings are synthesized on-the-fly as they are read to a user.

At this point the system begins a loop at 524 that accepts a user selection in step 528. By default, the system begins playing back the subject headings from each e-mail message to the user on his or her telephone using the synthesized voice files over IVR server 41. By pressing keys on his telephone keypad the user has the option of skipping a subject heading, deleting a particular message or playing a particular message. If the message is skipped the system then reads the subject heading of the next message. If a user selects that a message be deleted it is marked as unread and this indication is transferred back to the user's e-mail server 80 or 570 using the appropriate protocol. If the user selects in step 536 that the message be played then the e-mail server sends the message to the voice synthesis server, the message is synthesized into a voice file, and that voice file is transferred to the IVR server for playback to the user on his telephone. At this point the user has the option of skipping the message, playing it again, or deleting it. As the message is playing the user also has the option of hitting keys on the keypad to skip lines in the message either forward or backward. Once the message has finished playing the user has the option of continuing to play back the next subject headings as in step 532.

Loop 524 continues while the user makes appropriate selections. When the user is done he or she hits a key in step 542 and terminates retrieval of e-mail messages. At this point the loop ends and the user may hang up his or her telephone. In step 548 the system performs various cleanup operations to terminate e-mail retrieval. If supported by the protocol, messages are marked read, unread or deleted.

User Sign-Up

Figure 10:
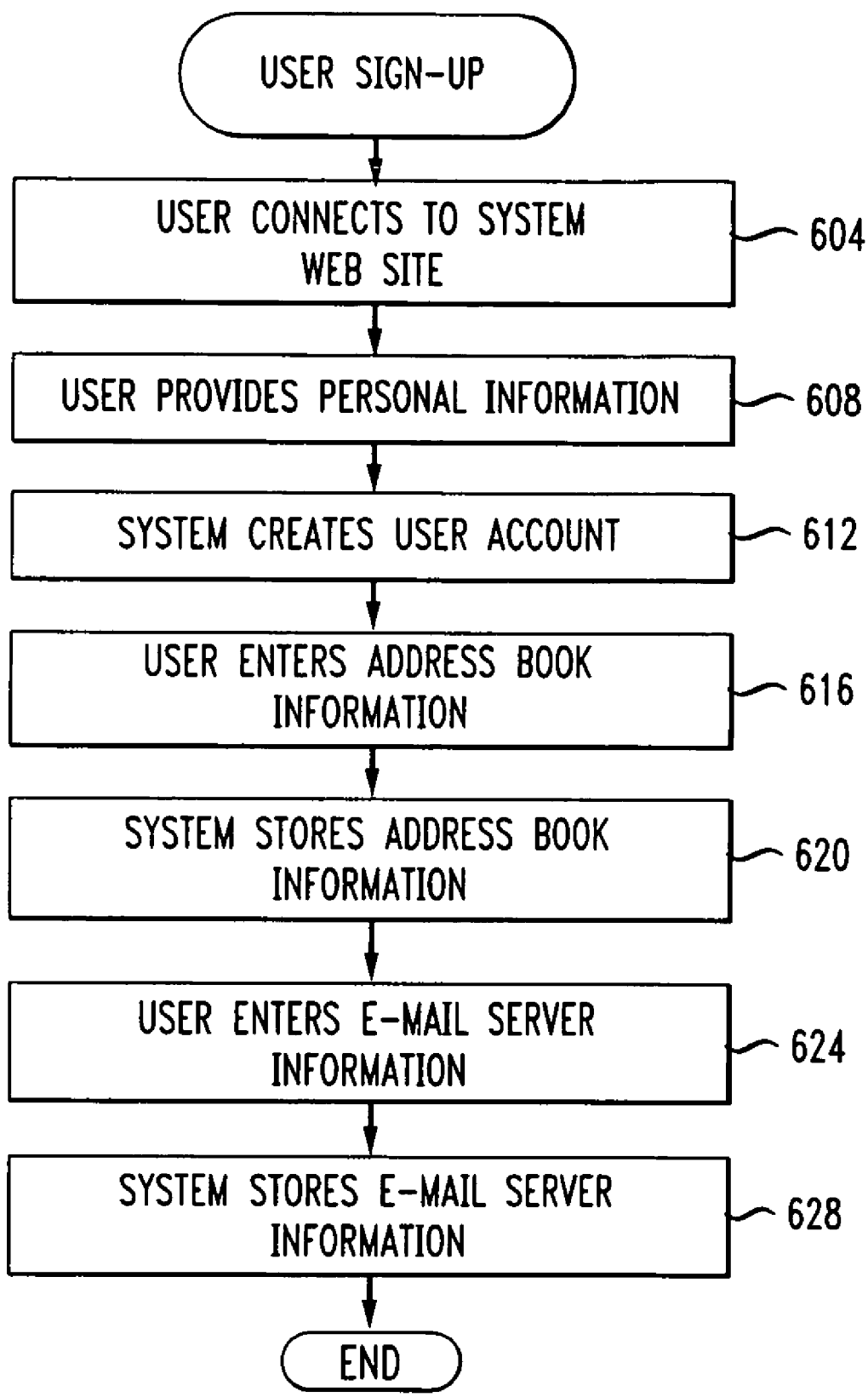
FIG. 10 is a flow diagram describing how a user signs up to use the message transmission system.

FIG. 10 is a flow diagram describing how a user signs up to use message transmission system 10. In step 604 a prospective user connects to the message transmission system web site and indicates that he or she wishes to sign-up to use the service. In one specific embodiment of the invention the user connects to the site "IMEVERYWHERE.NET."

FIG. 11 illustrates a data entry screen 650 by which a user enters personal information in order to sign-up for the message transmission system. In step 608 the user provides the personal information as shown such as name, telephone number, personal identification number, e-mail address, password, etc. The telephone number provided will become the user's login identifier. When dialing into the system in the future if the user is calling from this telephone number the system will recognize the user and ask for their PIN rather than requiring entry of the user's telephone number. When dialing in from another telephone number the system will ask the user to enter their login identifier (the telephone number provided during sign-up) and their PIN. In step 612 the system creates a user account by storing the user personal information into a user profile in a database and then sends an e-mail confirmation message which may contain their login user identifier (also called a user name) and their password.

FIG. 12 illustrates a user's e-mail address book. In step 616 the user clicks on an option to enter names, telephone numbers and e-mail addresses for people to whom the user wishes to send messages. Window 660 shows the user's address book that contains a country code, first name, last name, telephone number and e-mail address for each person. Also provided is an edit window 664 by which the user can add new names, make changes or delete names. By default, the user's own telephone number and e-mail address are automatically entered as a first entry into the address book. By providing a telephone number of an individual's mobile telephone that is SMS enabled, the user will be able to send SMS text messages to that individual; by providing the e-mail address of an individual, the user will be able to send e-mail messages to that individual. These messages are all sent by message transmission system 10 using the user's voice input from a telephone. In step 620 the system stores the entered address book information into a database server.

In step 624 the user indicates to the system that he or she wishes to enter e-mail server information so that the user may receive e-mail messages from any of a number of e-mail servers. The system first asks the user to choose the name of the e-mail provider and provide his or her e-mail address and password. If the user indicates that the e-mail provider is one of the many commercial e-mail services that provide free Web access (but not access via POP or IMAP protocols) then the system adds this e-mail account automatically as described in FIG. 14 below. Examples of such commercial e-mail services are America Online, EarthLink, Hotmail, etc. Assuming that the user indicates that his or her e-mail provider is not one of these commercial e-mail services that do not provide access via POP or IMAP, the system prompts the user to enter more detailed information regarding how to connect to the user's e-mail server.

FIG. 13 illustrates a data entry screen 670 by which the user provides detailed information about his or her e-mail server. The user provides his complete e-mail address (or username), the password, the address of the user's e-mail server, the port it uses, the protocol it uses (i.e., POP or IMAP), an optional description field, and whether the e-mail server requires SSL to access the user's e-mail account. By default, the system assumes that the e-mail server uses port 110 although the user may entered a nonstandard port if necessary. The user can also specify in which order e-mail messages will be read back. Once the user submits this information the system stores this e-mail server information in step 628 onto a database server. For the situation in which the user has earlier indicated that his e-mail account is with one of the commercial e-mail services that provide a limited Web access but not access via the POP or IMAP protocols, the system also stores this information as described below.

FIG. 14 illustrates e-mail accounts from which a user may retrieve e-mail messages. Shown is a list of e-mail accounts in window 680 and an edit window 690. Window 680 shows any number of e-mail accounts including for each: a login name (the full e-mail address), the domain, the e-mail server address, the port, protocol type, an optional description, an SSL flag and an order indicator. The system automatically creates this table of e-mail accounts after the user has entered information in step 624. The system automatically enters accounts for commercial e-mail services as follows. For example, if the user indicates that his e-mail service is Hotmail, the system automatically enters "Hotmail.com" in the domain field, enters "mailproxy.imeverywhere.net" into the server field and indicates the type of protocol is POP. The address "mailproxy.imeverywhere.net" is the address of e-mail proxy server 51 and access to the user's e-mail account on Hotmail.com (or another commercial e-mail service) using this proxy server has been described above. Using edit window 690 a user may also add a new e-mail account at a different e-mail server, make changes or delete an account.

Web Query Delivery System

The present invention allows an individual knowledgeable in a particular area or a web site having a particular expertise to advertise that expertise at the Internet search portal so that queries in that area are routed to them. The expert or individuals associated with the web site can then answer the user's query rapidly, succinctly and provide the exact information that the user needs.

For example, an expert on computer networking is not interested in seeing all of the thousands of queries per minute that a search engine processes, but would like to have those queries filtered so that only those queries categorized as "computer networking" or including keywords such as TCP/IP are routed directly to him or her. The user as well would certainly like to have their specific query about computer networking directed immediately to an expert or experts on the subject. Each expert answers the query using whatever means they wish and provides the answer to the user along with a price. The user may then choose the answer and price they wish. Thus, an expert provides a category or keywords for which they wish all such queries directed to them, and the user is provided with an exact answer to their question.

Figure 15:
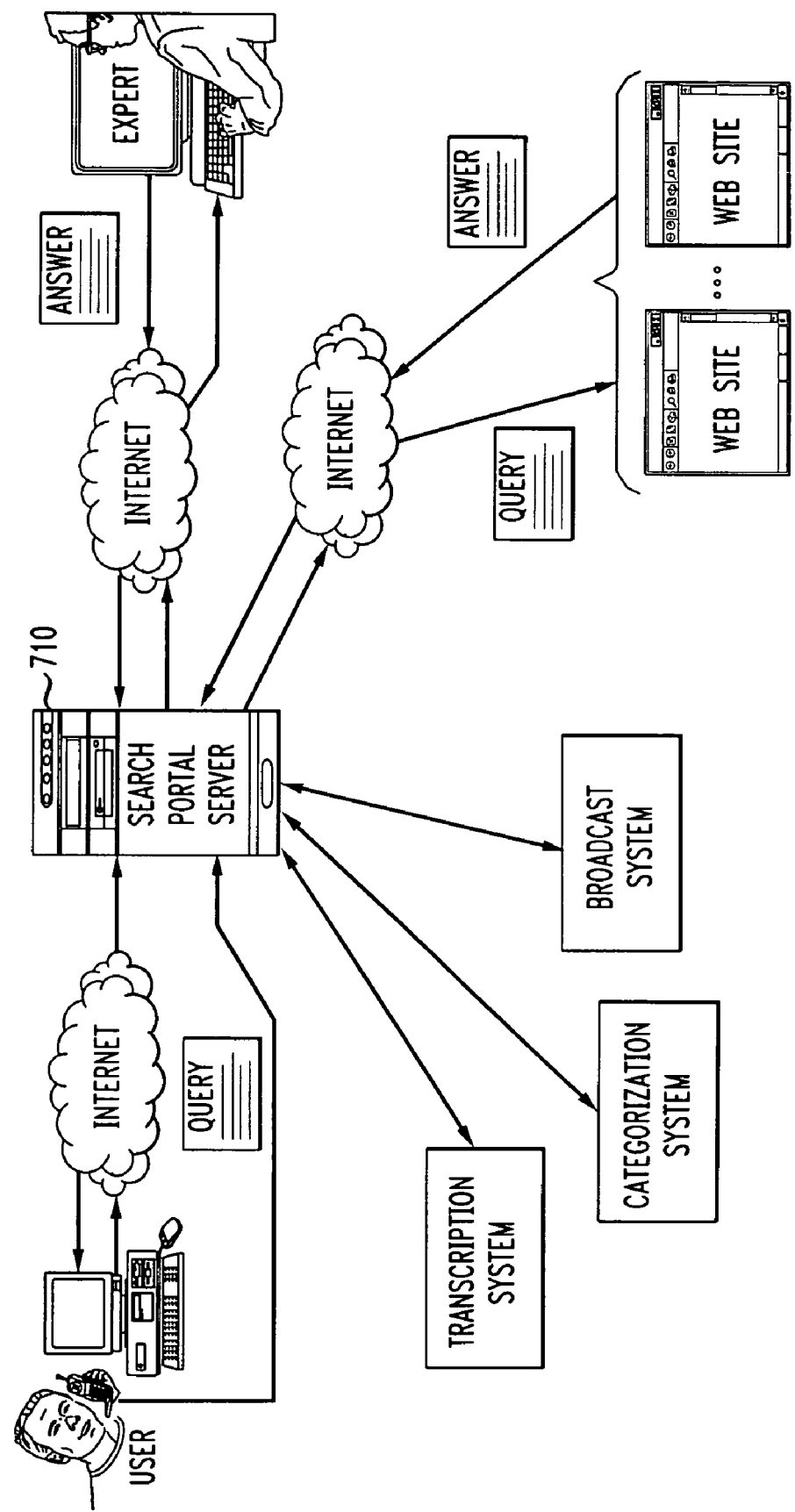
FIG. 15 is a block diagram of a web query delivery system.

FIG. 15 is a block diagram of a web query delivery system 700. Included are an individual user and access devices such as a telephone and a computer for communication with a search portal server over the Internet or telephone line. The telephone is any suitable telephone such as a traditional rotary dial or touchtone telephone, cordless telephone, cellular telephone, mobile telephone, or any similar device arranged to transmit voice or text. For example, PDAs or similar handheld electronic communication devices might also be arranged to function as telephones. On the telephone may also communicate with a VoIP (voice over IP) provider. The VoIP provider is any suitable VoIP provider arranged to accept a local telephone call, convert it into VoIP format and to transmit it over the Internet as a VoIP call to a destination. The user may also communicate with the search portal server as described in FIG. 1A.

The search portal server is any suitable server or collection of servers and may be housed in a facility for locating any number of computer servers and associated application software for receiving incoming telephone calls, processing those calls, farming out messages or requests for information and responding to the user. Search portal server implements an Internet search portal similar to those offered by Google or Yahoo, and may even be implemented by any Internet search portal company. This search portal accepts a query from a user, interacts with any of the systems shown, operates to deliver the query to a qualified expert or two any number of web sites, and then returns the answer to the query to the user. The answer may be sent directly from either the expert to the user or from a web site to the user, or the answer may pass via the search portal server.

The transcription system operates to receive a voice query from the user and to transcribe it into a text file and may be implemented using any suitable transcription technology such as message correction system 60 shown and described in FIGS. 1A-5A above. The categorization system operates to receive a user's query and to supply a category or list of keywords. The broadcast system operates to broadcast the user's query to any number of experts or web sites that have registered with the search portal server to receive queries pertaining to particular categories or keywords. The web sites shown are any number of independently operated web sites arranged to accepts the user's query, determine an answer using any suitable means, and then supply an answer back to the search portal server, or directly to the user. The expert is an individual having expertise in a particular category and who has registered with the search portal server to receive queries pertaining to particular categories or keywords and who answers a user's query either directly or by passing the answer back through the search portal server.

An expert, individual, or representative of a web site registers at the search portal server by providing to that server a single category or a list of categories for which the expert would like to receive related queries. In addition, the expert may also provide a list of keywords for which the expert would like to receive related queries. The process used may be any suitable subscription, registration or other sign up process in which the expert supplies this information to the search portal and the search portal acknowledges that the expert desires queries related to this information. In addition, each expert may be certified in a certain area or category by taking a test at the search portal or by supplying a certification from a third party. A web site may also register with the search portal by supplying categories in keywords relating to queries that the web site wishes to receive. For example, a travel web site (that normally might be listed in the results of a travel query on a traditional search engine) tells the search portal that it wishes to receive any queries related to travel or to specific areas of travel. In this way, rather than a user being blindly directed to any number of travel web sites in response to a submitted query, the entire specific query will be forwarded to this travel web site in order that it may be answered.

Query Classification Flow

As described above, experts or web sites register their desired categories and keywords with the search portal. At the user end, the user formulates a query to be submitted to the search portal. The query may be a full, grammatically correct question, rather than simple keywords. Further, the text submitted need not necessarily be in the form of a question, but may also be a statement upon which action can be taken, a command, or an advertisement such as a wanted advertisement or a for sale advertisement. Each of these forms of statements can also be routed to an expert, an entity or a web site based upon a categorization of the statement or upon keywords found in the statement. Once the statement has been routed to the appropriate entity, a particular action may be taken on behalf of the user based on the statement. In this way, statements, commands and advertisements as well as queries from the user can be acted upon in an efficient manner. The term "query" or "question" will be used below with the understanding that the query may also be one of the above types of statements.

Figure 16:
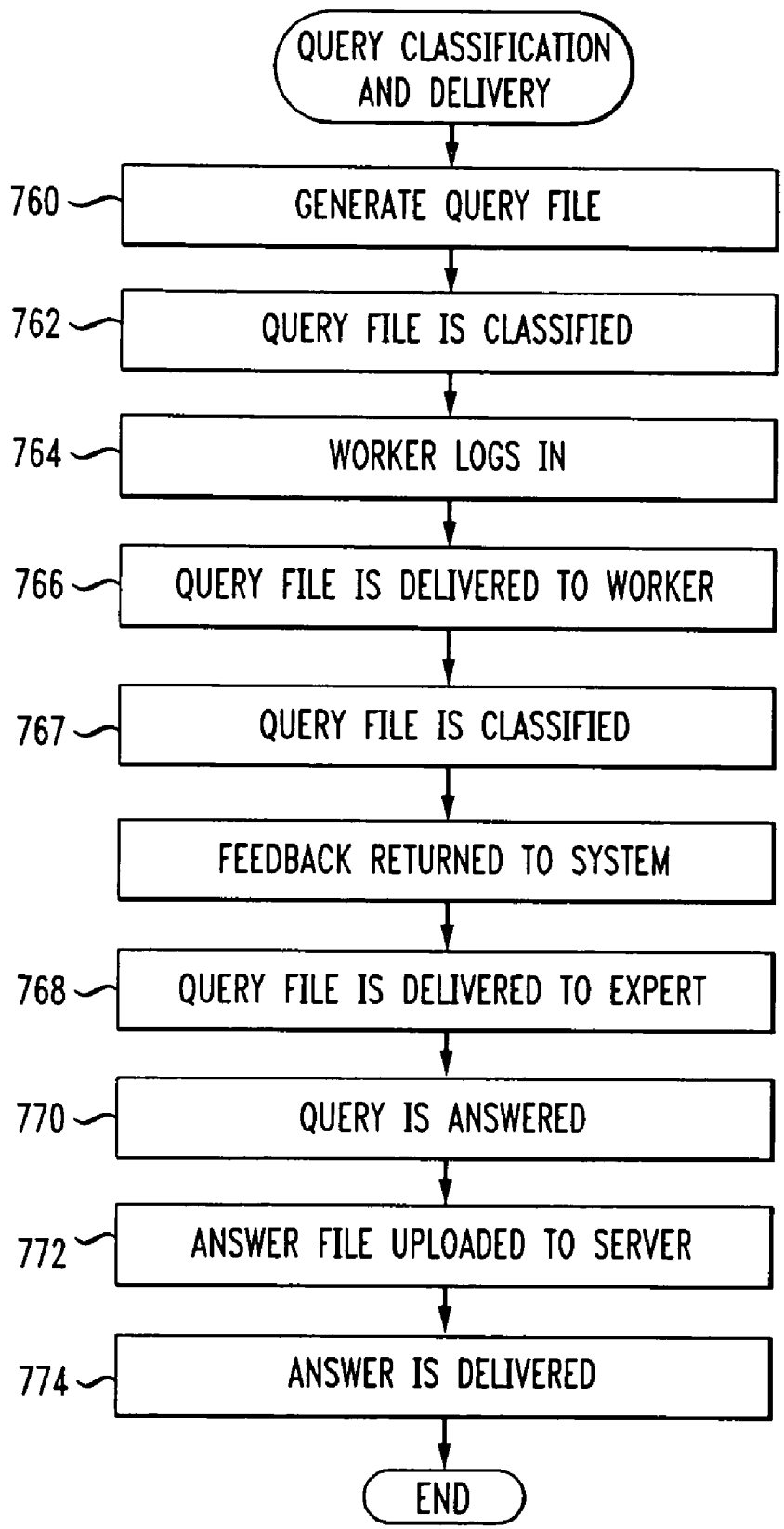
FIG. 16 is a flow diagram describing how a query from a user is classified and then answered.

FIG. 16 is a flow diagram describing how a query from a user is classified and then answered. In step 750 a user accesses the search portal and delivers a query to the web query delivery system and directs the system provide him an answer by a particular delivery means. The user may access the search portal via the Internet, mobile telephone, or other techniques described above.

In step 760 a textual query file is generated that contains the text of the user's query and is stored on a database server in association with an original voice file (if any) and associated database fields. If the user submits a query by voice the voice file is transcribed as discussed above (or using any other technique) and the resultant text is stored in the query file.

Figure 17:
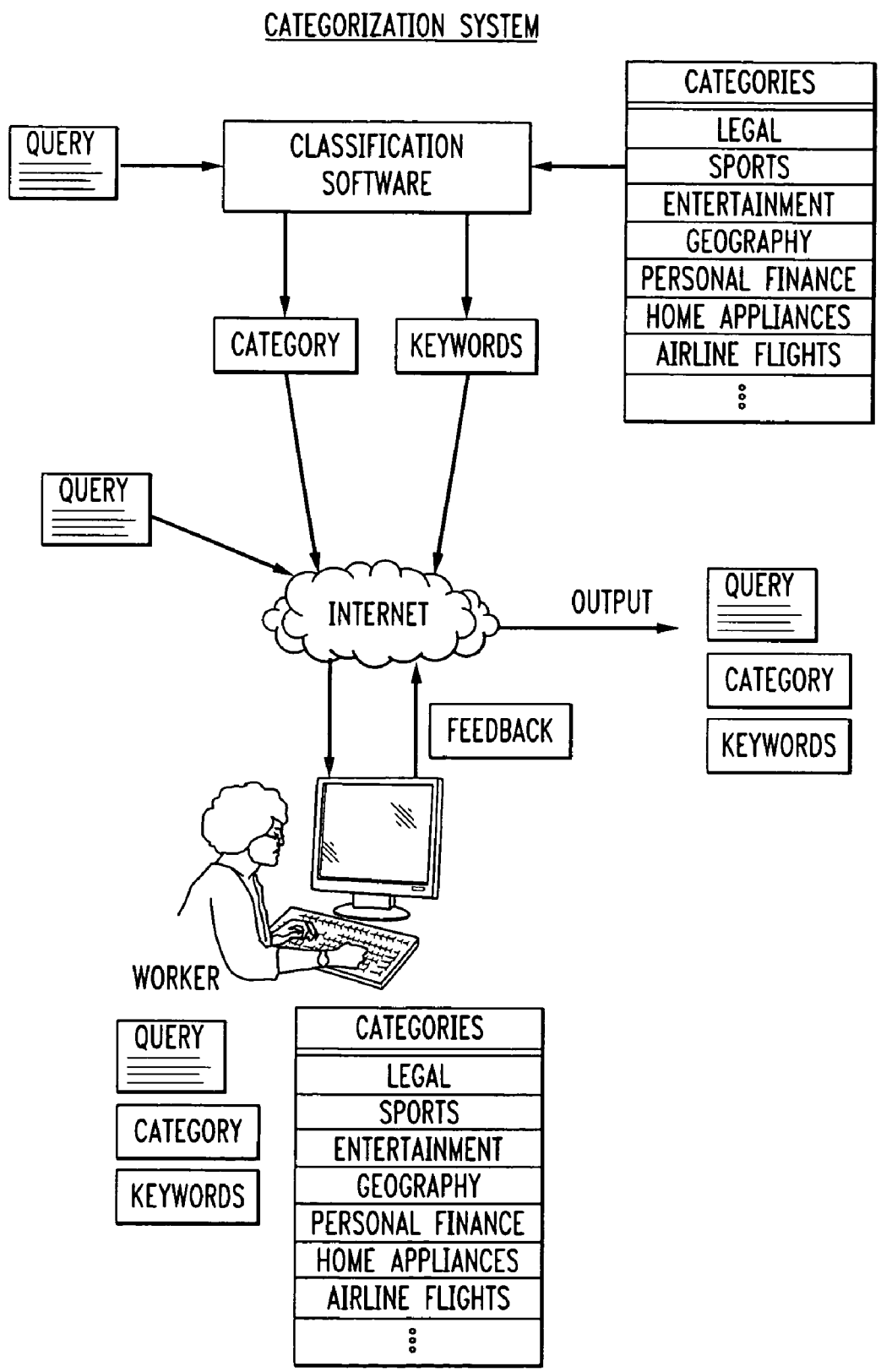
FIG. 17 is a query categorization system according to one embodiment of the invention.

FIG. 17 is a query categorization system according to one embodiment of the invention. Query categorization system accepts a query and outputs the query along with a category, list of categories or keywords associated with that query. The query categorization system includes classification software and a worker using a personal computer at a remote location accessible over the Internet.

At 762 the incoming query file is optionally classified according to the field of the query using classification software. The query file is input to the classification software that recognizes keywords in the query and generates a list of written keywords that best characterizes the nature of the question. The classification software is also able to output a category or list of categories based upon the query. For example, categories may include: legal, sports, entertainment, etc., as shown. Any number of categories are possible and may be generated by the operator of the search portal or may be empirically derived simply by using the categories of interest submitted by the expert or web sites seeking to answer questions. At this point, the query; category and keywords may be output or may be further processed as described below.

The following description assumes that either classification software has not been used, or, the derived category or keywords need further refinement using human help. In step 764 a worker logs in to the web query delivery system for the purpose of classifying queries. In step 766 management software periodically polls available files in the database, notices that the query file is ready to classified, and delivers the query file and any existing classification results (such as category or keywords) to the worker over the Internet. The worker uses a computer to view the query and any category and keywords and produces feedback resulting in possible modifications to the category and keywords. The worker may also be provided with an original voice file for listening to the query over streaming audio instead of, or in addition to, reading the text of the query.

For example, if the worker is only provided with the query, the worker reads the query and using the list of available categories quickly selects a category or categories into which the query is best classified. The worker then provides feedback by delivering these selected categories back to the categorization system for output. If the worker also receives a tentative category or keywords, the worker again reads the query and confirms the existing classifications, or modifies them and returns this feedback to the categorization system for output. In one embodiment, the worker reads the query file on his or her screen (i.e., the question asked by the user), reads the list of supplied keywords, and either confirms the classification provided by the keywords or makes modification based upon the written query and his or her experience. In another embodiment, the worker distills the list of keywords into a single keyword that accurately classifies the nature of the question. It is also possible that the classification provided by the earlier classification software need not be changed. When finished, the worker uploads the new classification back to the database server. The management software then receives an indication that the worker has finished his or her work, updates classification results in a database and prepares to send the query file and category and keywords to an appropriate expert.

In another embodiment of the invention, a query may be classified using an assembly line of workers as shown and described, for example, in FIGS. 3 and 6A above.

FIG. 20 illustrates database fields of a database that are associated with a particular query from a user. Field 802 indicates whether a particular query has been classified and is ready to be sent to an expert. Field 804 indicates whether a query has been sent. Field 806 indicates the delivery means specified originally by the user for delivery of the answer. Field 808 indicates the category or categories determined by the classification software or by the worker. Field 810 indicates the keywords likewise determined. Field 812 indicates a suitable address of the user for delivery of the answer.

Query Delivery Flow

FIG. 18 illustrates a match database used to store the names of experts who have registered with the search portal and their desired categories. In the first column are stored the names of the experts, individuals, web sites, or contacts at entities who desire to answer user queries. The second column contains the exact contact address for the particular expert and is the address to which a query will be directed. A contact address may be an e-mail address, and IP address, a web site, a telephone number, a mailing address, etc. The third column includes the category or categories specified by the expert. The fourth column includes any keywords specified by the expert. Should a category or a keyword from a particular query match any of the categories or keywords specified by an expert, then the query is directed to that expert. Boolean expressions may also be used with the categories and keywords. For example, an expert may specify that he or she would like queries only if classified in categories A, B and C, or may specify queries classified in D and F, as long as they are not also classified in E. Keywords may also be specified by the expert in this manner. For example, the expert or web site may specify that they wish to view all categories of keywords except the categories of "sports" and "entertainment," or may specify they wish to view all queries except those queries containing certain keywords.

Categories or keywords submitted by an expert or web site for the purpose of receiving certain queries may also be changed on-the-fly. For example, an expert who receives too many irrelevant queries may upload a new category or keywords in real-time so that the queries he or she receives are narrowed. The expert can use a Boolean expression to accept queries from certain categories as long as they do not contain certain keywords. Further, an expert or web sites may maintain automated software that automatically reviews the volume and types of queries and automatically submits modifications to the categories are keywords if too many irrelevant queries are being received.

In step 768 management software of the search portal delivers the query file and optionally the determined categories and keywords to an appropriate expert over an Internet connection. The management software attempts to match the expert's desired categories and keywords as shown in FIG. 4 with the classification for the query obtained from the classification software or from feedback from the worker. The query file is delivered to the expert (or other entity) using the contact information in the database. The query file may also be broadcast to any number of web sites as shown in FIG. 1 using a broadcast system as further described below.

In step 770 the expert (or other entity) receives the query and attempts to answer it using any suitable means. For example, the expert may answer the query based on immediate knowledge, by using an FAQ database, by performing an Internet search, by performing research, by polling others, etc. Because the expert has directed to him or her only those queries being classified in a certain category he or she is in a much better position to immediately and accurately answer the query of the user. The expert may receive a text query file or also an original voice file or even a voice-synthesized voice file based upon a query text file.

Once an answer is created or found, the expert creates an answer file in any suitable fashion. The answer file is then uploaded at 772 to a database server associated with the search portal and the appropriate flags are then set or reset in the associated database fields of FIG. 20 to indicate to the management software that this answer file is now ready for delivery to the user. In step 774 the answer file on the database server is delivered to the user, for example, as previously described in step 356. The original voice file (if any) and the answer file are also stored on a file server so that a user may later search through these files. In an alternative embodiment, the expert is also provided with the delivery means specified by the user so that the expert may deliver the answer directly to the user instead of using the search portal server.

In an alternative embodiment, the user's query is delivered in parallel to any number of experts, entities or web sites having a category or keywords that match the particular query. In this fashion, a question from the user can be answered by any number of experts, each providing a potential answer to the search portal or directly to the user. In this situation, the user may choose the best answer, the one quickest to arrive, or the one that is the most accurate, and only pay for that one. In this embodiment the search portal aggregates all the answers from the various experts and provides the user with a message, screen, or web page including the links to each expert's web site. Each link includes a synopsis of the experts answer along with the price. If the user decides to click on the link he agrees to the price; if he is not satisfied there is no charge.

Frequently Asked Questions

In one embodiment, the web query delivery system utilizes any number of FAQ databases in order to more efficiently answer questions. FIG. 19 illustrates one such FAQ database maintained by the search portal server. An identifier is assigned to each incoming query from user and it and the query itself are stored in the database. Also stored in the database is an answer to the query received from an expert. Software on the search portal server identifies equivalent queries based upon a simple textual comparison or through the use of keywords. Identifiers for equivalent queries are entered into the "Equivalents" column for a particular query. Also, each expert determines whether a query is deemed to be equivalent to a previous query they have processed, and in this fashion the Equivalents column may also be filled out. When a new query comes in management software searches this FAQ database to determine if an equivalent query and an existing answer already exist. If so, this answer may be directly sent to the user, or, the original query, a new query and the proposed answer is sent to an expert for confirmation and/or refinement. In another embodiment, a database of this format is also kept by each expert or web site seeking to answer questions and is maintained at that location.

Broadcast System

In one embodiment of the web query delivery system user queries are broadcast to any number of web sites or experts in addition to (or instead of) a query being sent directly to an expert.

Figure 21:
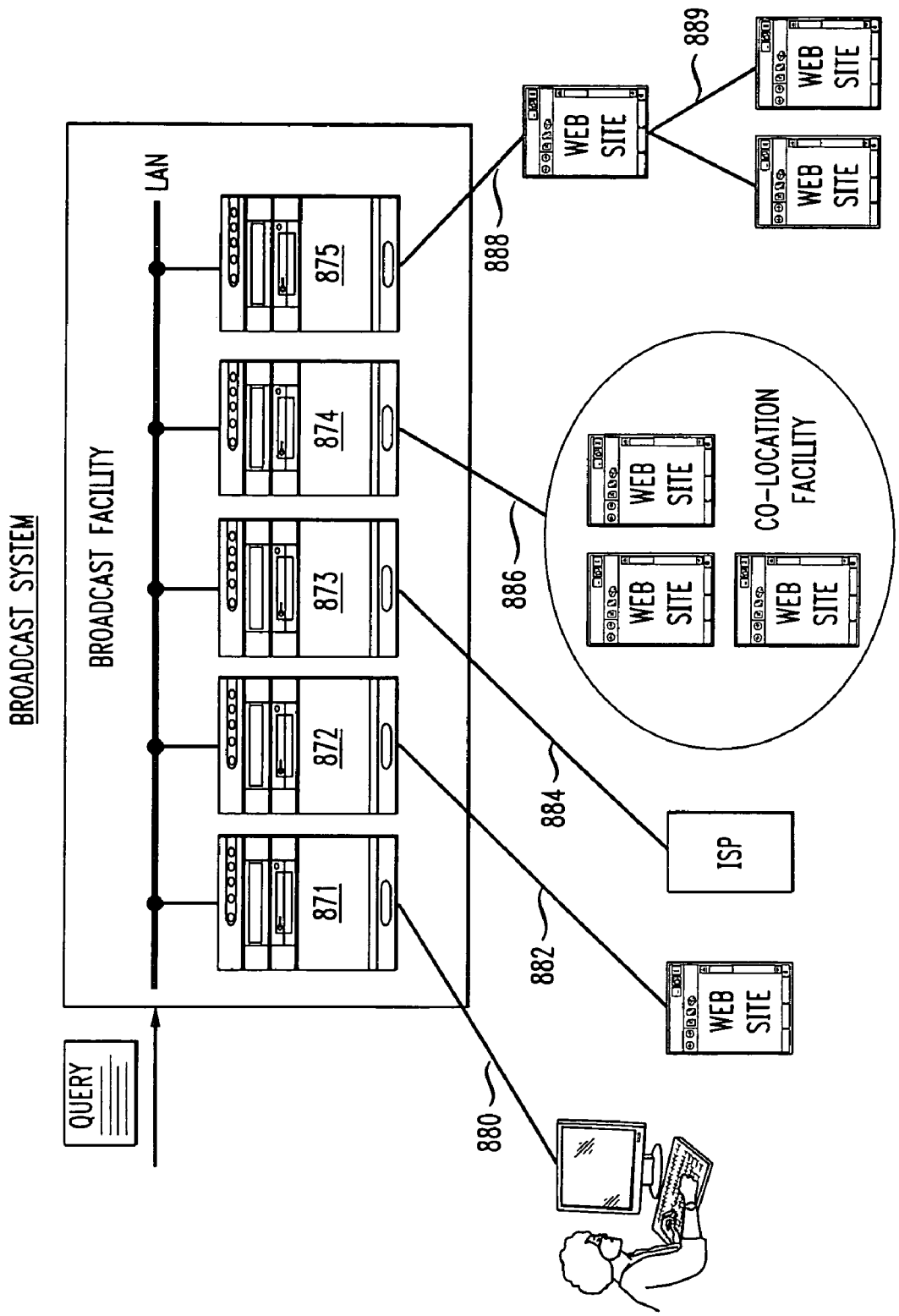
FIG. 21 illustrates a block diagram of the broadcast system of FIG. 15.

FIG. 21 illustrates a block diagram of the broadcast system of FIG. 15. The broadcast system may be a separate system and facility from search portal server 710, may be integrated into the search portal, or may actually include the search portal server within its broadcast facility. The broadcast system shows the user query arriving at a broadcast facility and then being distributed in any suitable manner to experts, web sites, or other facilities.

The broadcast facility is any suitable hosting facility or other location arranged to host any number of servers, and including means for broadcasting information over the Internet, over a cable network, over a satellite network, over a television network, etc. Any number of user submitted queries arrived at the broadcast facility; the broadcast facility is arranged to handle on the order of 10,000 queries a second, which is an approximate number of queries being generated currently over the Internet. Preferably, along with each query submitted are the classification results including the category and keywords. Included within the broadcast facility is a local area network (LAN) or other suitable network for routing the query and results to any number of hosted servers within the facility. Each server is arranged to filter or to not filter the received queries and to broadcast them to entities desiring to receive the queries.

In one embodiment, experts, web sites or other entities submit categories and keywords to the broadcast facility or to the search portal indicating the types of queries they wish to receive. This process may be performed in the same manner as how companies currently submit advertisements to appear on Internet search engines when a user performs a query and views the results. But, unlike advertisements appearing on a search engine that blindly respond to particular keywords that the user has typed in (or that the search engine has defined for that query), the present invention submits the entire and complete query to an expert or web site so that the user may receive an exact response.

For example, server 871 includes the match database, information and software as described above arranged to filter the incoming queries and to send the filtered queries over Internet connection 882 to an expert having a computer. The expert then answers the query and responds to the user as described above. Server 872 also includes the filtering database and software and is arranged to send the filtered queries over Internet connection 882 to a web site that has previously registered with the broadcast facility to only receive certain queries. Once the web site receives the query, it generates an answer to the query in any suitable manner (by using a human expert, by automated analysis of the database, etc.) and returns the answer to the user as described above. As described earlier, the web site or expert is able to place its own filter at the broadcast facility simply by registering and submitting a category or keywords related to the queries it wishes to receive. Server 873 is arranged to send all queries received at the broadcast facility over a suitable connection 884 to an Internet service provider who may then redistribute all the received queries to any number of web sites or individuals with computers. In this manner, a web site or individual may choose to receive all queries being submitted instead of filtering those queries.

Similarly, server 874 also sends all received queries unfiltered to a co-location facility over connection 886. Connection 886 is not necessarily an Internet connection, but may be a cable network, a satellite broadcast network, or other communication means for distributing high-bandwidth information. As is known in the art, co-location facility is a hosting site for any number of web sites (sometimes on the order of hundreds). The co-location facility receives all of the unfiltered queries and distributes these queries to its hosted web sites. Alternatively, co-location facility includes the match database, associated information, and filtering software needed to distribute filtered queries to interested web sites. In this manner, a web site being hosted at the co-location facility submits categories or keywords to the co-location facility (instead of to the search portal or broadcast facility), and it is the co-location facility that filters the incoming queries and delivers only the relevant queries to that web site.

Server 875 includes the match database, associated query information, categories, keywords and filtering software needed to present filtered queries over a suitable communications link 888 to web site 890. In this embodiment, web site 890 operates an Internet search engine that accepts advertisements related to the specific categories or keywords that web site 890 is interested in answering. For example, web site 890 submits to server 875 the keywords "roses" and "gardening" because web site 890 would like to answer all queries from users relating to the growing and care of roses in a garden. Because this web site now receives all queries related to growing roses, it is able to solicit advertisements from, and to receive income from, all individuals or companies wishing to advertise rose-related products and services on its site. Thus, web site 890 is able to return to the user not only an answer to their query regarding gardening and roses, but also links to any other site that has provided an advertisement regarding roses.

Further, web site 890 may also rebroadcast a received query from user over any suitable communications link 889 to any number of other web sites who have expressed an interest in receiving rose related queries. These additional web sites may indicate interest in receiving queries regarding the exact category or keywords that web site 890 has specified (namely, roses and gardening), may specify a narrower subset of those categories or keywords (for example, only queries relating to roses, gardening and rose diseases), or may specify an entirely different category or keywords using a Boolean expression. Of course, these additional web sites know that any queries they decide to filter will have already been filtered based upon the category or keywords supplied by web site 890. In this fashion, a user's query can be broadcast and rebroadcast any number of times so that the query reaches the broadest possible audience with the goal that the query is answered quickly and accurately.

As discussed above, the search portal server or any of the experts or web sites may maintain an FAQ database and associated database fields in order to match incoming queries with previously answered equivalents. The broadcast facility may also maintain such an FAQ database in order to match incoming queries. If the query matches, the query need not be necessarily broadcast or sent to an expert or web site, but the answer can be retrieved from the database and returned to the user.

Query Delivery System as a Subsystem of the Voice Query System

In one embodiment of the invention, web query delivery system 700 is integrated into voice query system 70. In this embodiment, after transcription of a query in voice query system 70, the query is delivered to web query delivery system 700 for answering. The search portal server of the web query delivery system may be a separate server within server facility 40, may be accessible over the Internet, or may be implemented upon one of the servers in facility 40. In other words, once the query is delivered to voice query system 70 for answering (as previously described with reference to FIG. 6A or 6B), the query may also be delivered to the broadcast system of the web query delivery system 700 of FIG. 15. Or, search portal server 710 may be integrated into server facility 40, in which case as soon as the query arrives it is transcribed, if needed, and then broadcast over the above-described broadcast system.

In another embodiment, each of the agents shown in FIG. 6B begins to specialize in a particular area of expertise. Each agent may decline to answer a query unless it is in the area of expertise. As they develop expertise, the agent submits a category or keywords to the broadcast system or search portal server such that only relevant queries are sent to them. As the voice query system adds more and more agents, and as each agent begins to specialize and to filter the queries they receive, voice query system 70 morphs into the broadcast system of FIG. 21 where queries are broadcast to anyone having a specialty who is interested in answering queries.

Computer System Embodiment

Figure 22A:
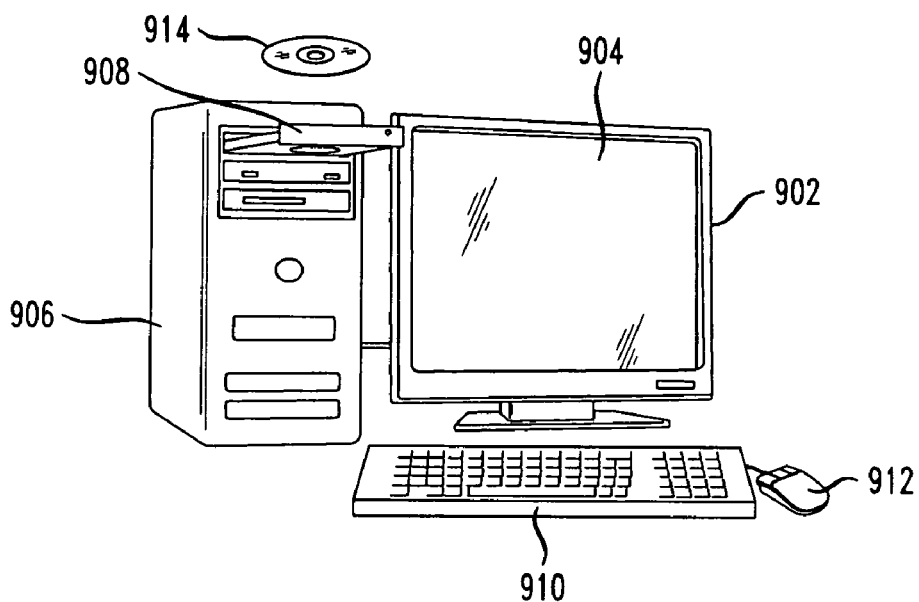
FIGS. 22A and 22B illustrate a computer system suitable for implementing embodiments of the present invention.
Figure 22B:
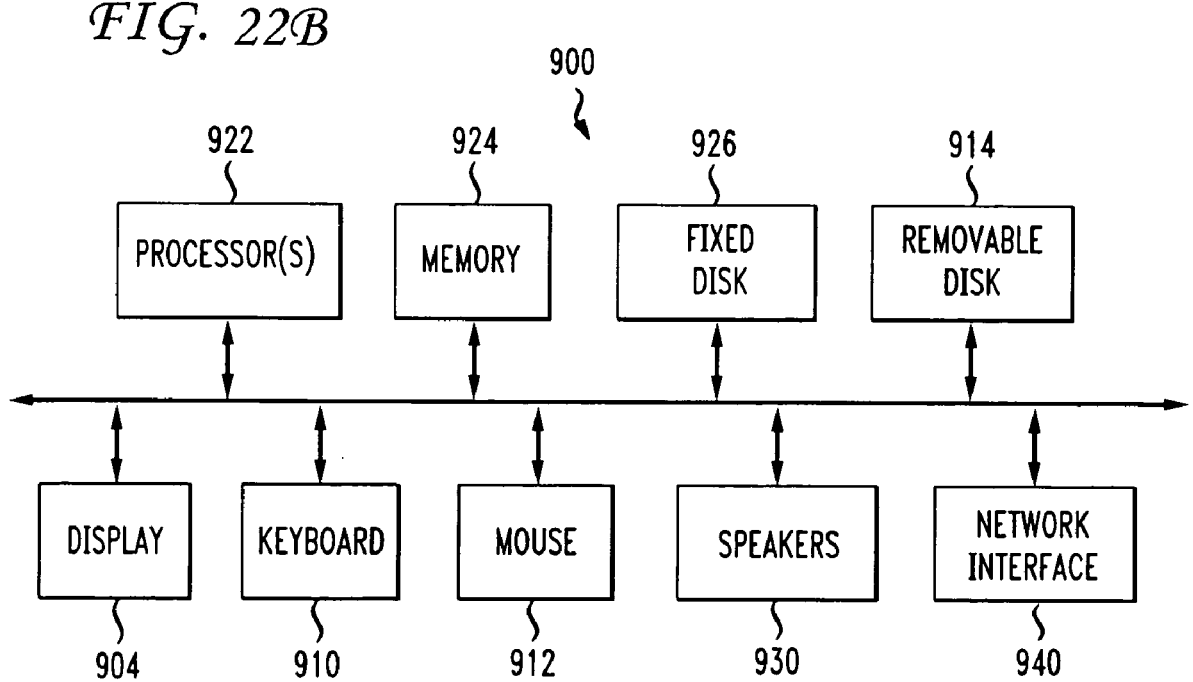

FIGS. 22A and 22B illustrate a computer system 900 suitable for implementing embodiments of the present invention. FIG. 22A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 22B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of transcribing a message comprising:
    receiving a voice message from a user at a computer server along with a recipient address;
    recording said voice message as a voice file at said computer server;
    executing a speech recognition engine to transcribe said voice file into a text file;
    sending said voice file and said text file to a computer workstation operated by an agent;
    receiving a corrected text file from said computer workstation at said computer server, said corrected text file being a more accurate transcription of said voice file than said text file;
    comparing said text file with said corrected text file to determine the accuracy of said speech recognition engine;
    determining that said accuracy of said speech recognition engine is sufficient and that future voice messages from said user need not be corrected by an agent;
    routing said corrected text file and said recipient address to a delivery means; and
    delivering said corrected text file to a recipient using said recipient address.

2. A method of transcribing a message comprising:
    receiving a voice message from a user at a computer server along with a recipient address;
    recording said voice message as a voice file at said computer server;
    executing a first speech recognition engine to transcribe said voice file into a first text file;
    executing a second speech recognition engine to transcribe said voice file into a second text file;
    comparing, by said computer server, said first text file and said second text file to determine accuracy of words and phrases;
    producing, by said computer server, a hybrid text file based upon said first text file and said second text file, said hybrid text file being is more accurate than said first text file or said second text file,
    sending said voice file and said hybrid text file to a computer workstation operated by an agent;
    receiving a corrected text file from said computer workstation at said computer server, said corrected text file being a more accurate transcription of said voice file than said hybrid text file;
    routine said corrected text file and said recipient address to a delivery means; and
    delivering said corrected text file to a recipient using said recipient address.

3. A method as recited in claim 2 wherein said step of comparing uses accuracy information for a first phrase from said first text file along with accuracy information for a corresponding second phrase from said second text file to determine the accuracy of said first and second phrases.

4. A method of transcribing a message comprising:
    receiving a voice message from a user at a computer server along with a recipient address;
    recording said voice message as a voice file at said computer server;
    executing a speech recognition engine to transcribe said voice file into a text file;
    sending said voice file and said text file to a computer workstation operated by an agent;
    receiving a corrected text file from said computer workstation at said computer server, said corrected text file being a more accurate transcription of said voice file than said text file;
    routing said corrected text file and said recipient address to a delivery means;
    delivering said corrected text file to a recipient using said recipient address;
    feeding said text file and said corrected text file into said speech recognition engine, said corrected text file being flagged as the correct version of said text file;
    building a user speech profile based upon said step of feeding by said speech recognition engine; and
    storing said user speech profile for said user in association with said speech recognition engine.

* * * * *